United States Patent

Tozuka

[11] Patent Number: 5,318,331
[45] Date of Patent: Jun. 7, 1994

[54] ROBOT FINGER STRUCTURE

[76] Inventor: Tadao Tozuka, 22-3, Sumiyoshi 1-chome, Hamamatsu-shi, Shizuoka, Japan

[21] Appl. No.: 973,480

[22] Filed: Nov. 9, 1992

Related U.S. Application Data

[63] Continuation of Ser. No. 652,118, Feb. 7, 1991, abandoned.

[30] Foreign Application Priority Data

| Feb. 9, 1990 | [JP] | Japan | 2-28533 |
| Feb. 16, 1990 | [JP] | Japan | 2-13797[U] |
| Feb. 16, 1990 | [JP] | Japan | 2-33968 |
| Feb. 19, 1990 | [JP] | Japan | 2-36287 |
| Jul. 9, 1990 | [JP] | Japan | 2-72299[U] |

[51] Int. Cl.$^5$ ............ B25J 15/80; B66C 1/42
[52] U.S. Cl. ............ 294/88; 294/106; 901/37
[58] Field of Search ........ 294/88, 106, 119.3, 294/902; 901/21, 37, 39; 623/64

[56] References Cited

U.S. PATENT DOCUMENTS

| 2,545,452 | 3/1951 | Fletcher | 623/64 |
| 2,659,896 | 11/1953 | Biasi | 623/64 |
| 3,090,049 | 5/1963 | Lanteigne | 623/64 |
| 3,284,964 | 11/1966 | Saito . | |
| 4,350,381 | 9/1982 | Hellmann | 294/106 X |
| 4,367,891 | 1/1983 | Waver et al. | 294/88 |
| 4,480,170 | 10/1984 | Kondou et al. . | |
| 4,661,039 | 4/1987 | Brenholt . | |
| 4,715,638 | 12/1987 | Chambers | 294/88 |
| 4,781,103 | 11/1988 | Maruyama . | |
| 4,784,042 | 11/1988 | Paynter | 901/21 X |
| 5,054,834 | 10/1991 | Alessandri et al. | 294/88 X |

FOREIGN PATENT DOCUMENTS

| 4091641 | 4/1981 | Fed. Rep. of Germany . |
| 8808836 | 1/1988 | Fed. Rep. of Germany . |
| 3813708 | 11/1988 | Fed. Rep. of Germany . |
| 1500113 | 9/1967 | France . |
| 1382444 | 1/1975 | United Kingdom . |
| 0204502 | 12/1986 | United Kingdom . |
| 2175877 | 12/1986 | United Kingdom . |

*Primary Examiner*—David M. Mitchell
*Assistant Examiner*—Dean J. Kramer
*Attorney, Agent, or Firm*—Townsend and Townsend Khourie and Crew

[57] ABSTRACT

A robot finger structure includes a first joint member, a second joint member, a fluid pipe, and a third joint. The first joint member has a fluid path. The second joint member has a fluid path and is pivotally supported by the first joint member while the fluid path of the second joint member communicates with the fluid path of the first joint member, pivotal movement of the second joint member being stopped upon abutment with the first joint member. The fluid pipe supplies a fluid to the fluid path of the first joint member. The third joint member is pivotally supported by the second joint member, is pivoted upon reception of a pressure of the fluid supplied to the first and second joint members through the fluid paths, and is brought into contact with the second joint member.

6 Claims, 25 Drawing Sheets

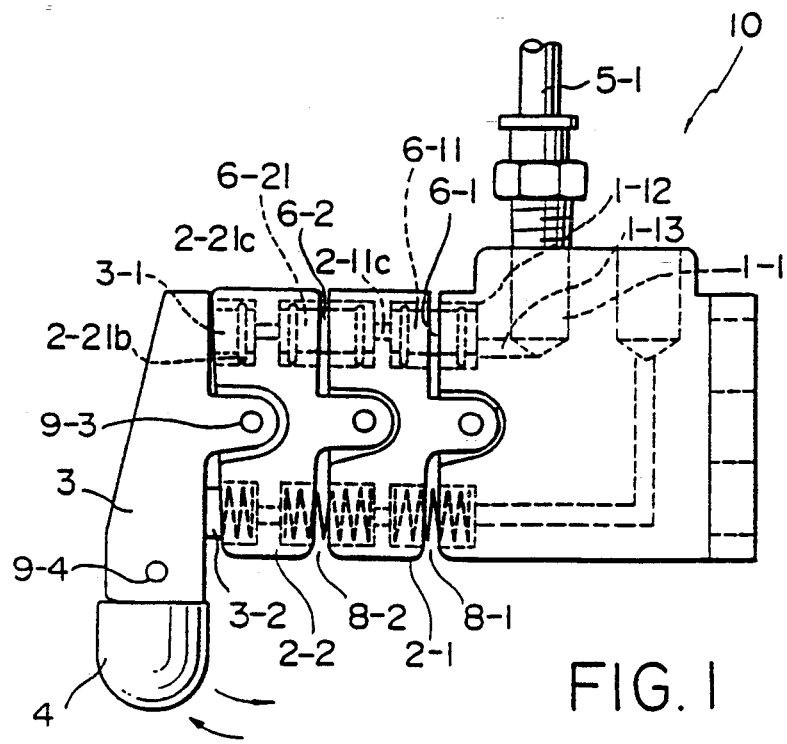
FIG. 1
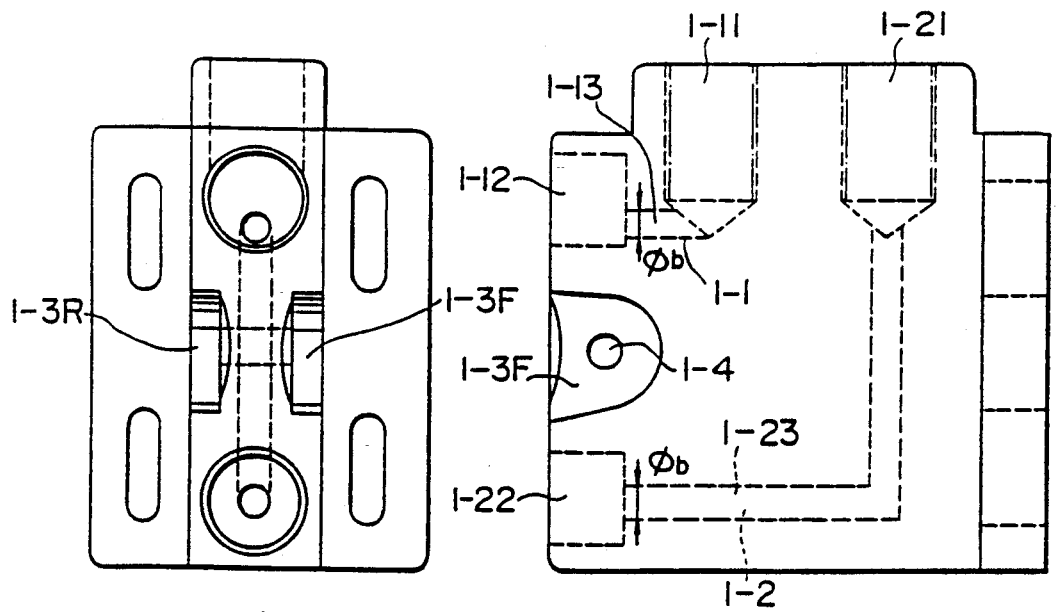
FIG. 2A
FIG. 2B

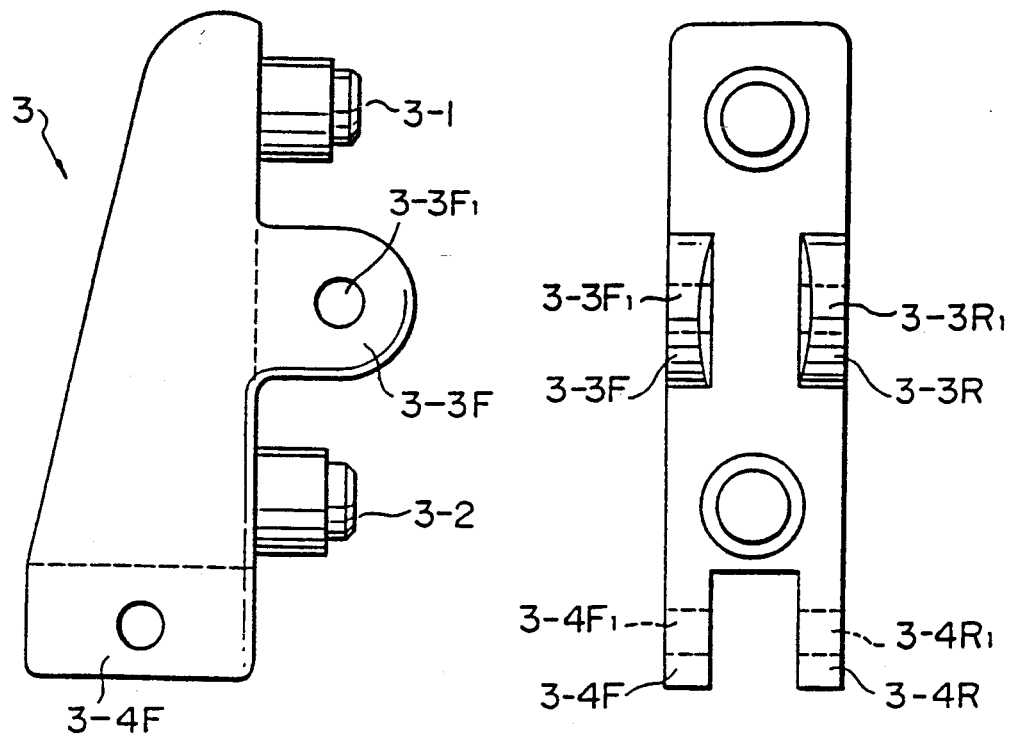
FIG.4A  FIG.4B
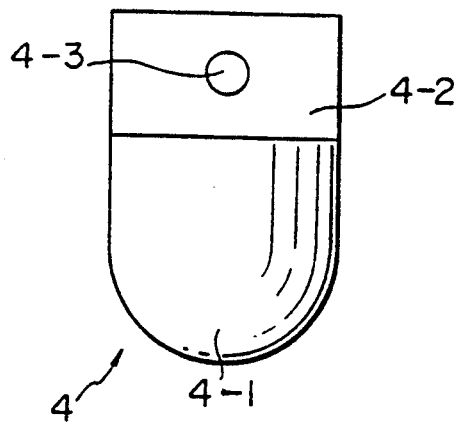 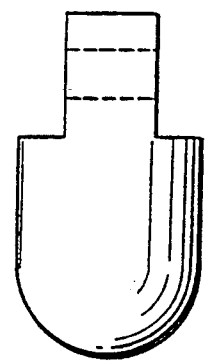
FIG.5A  FIG.5B

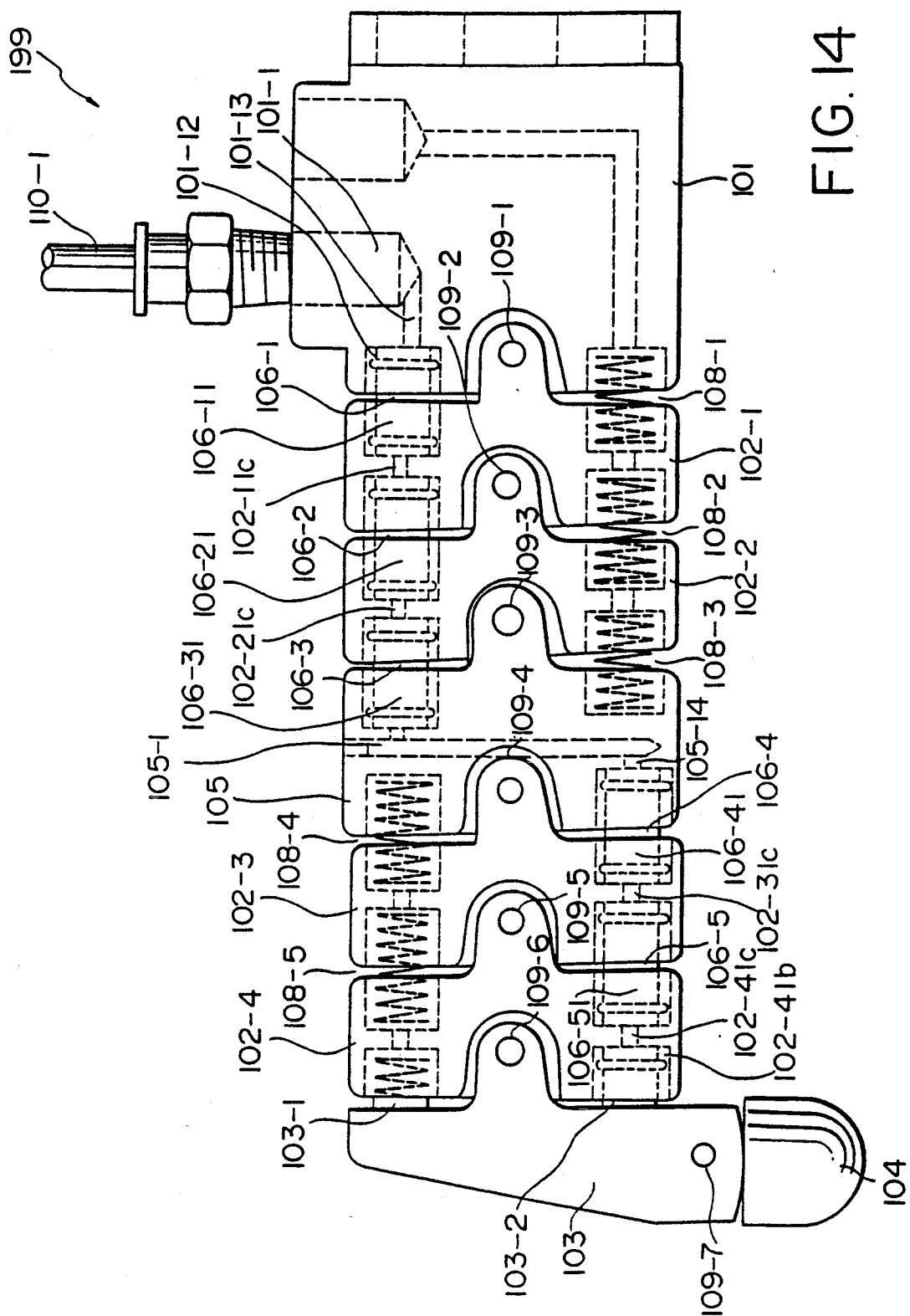

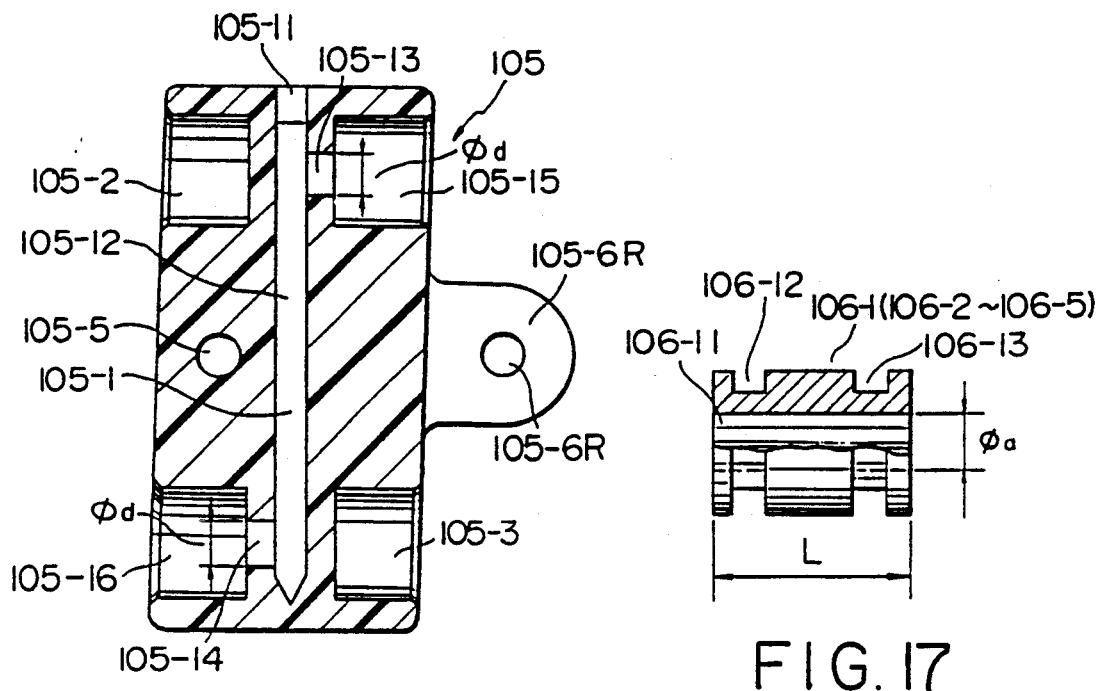
FIG. 16
FIG. 17
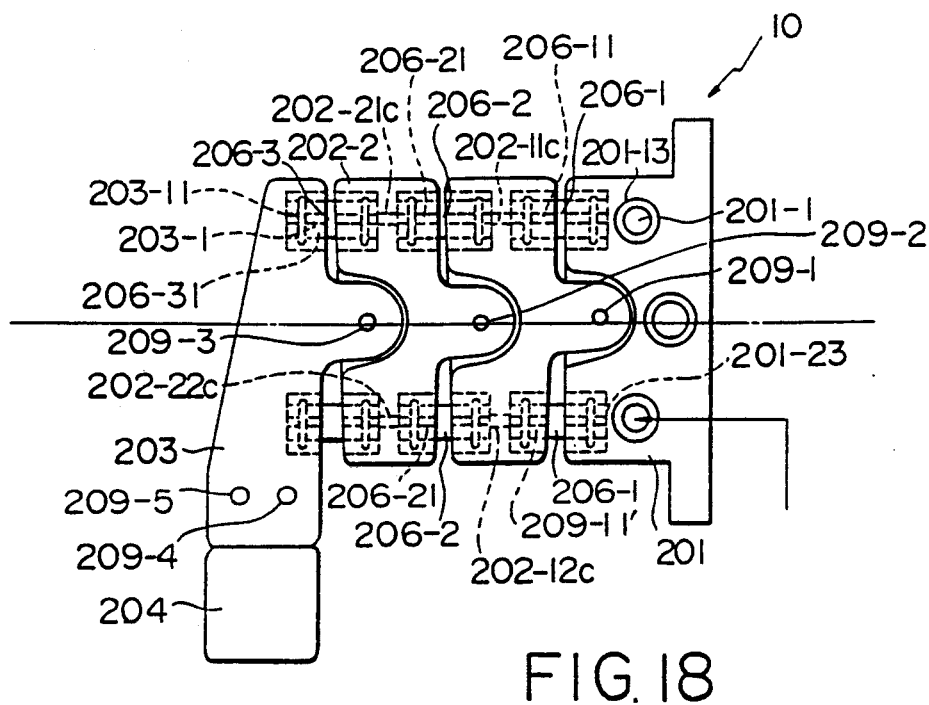
FIG. 18

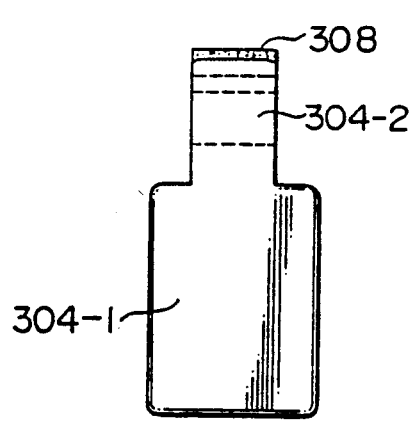
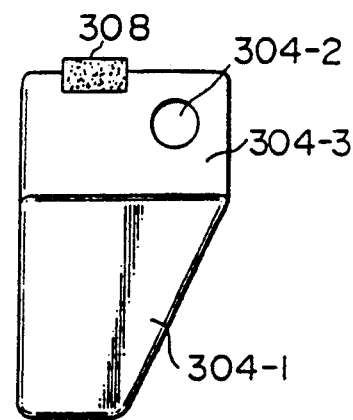
FIG. 28A  FIG. 28B
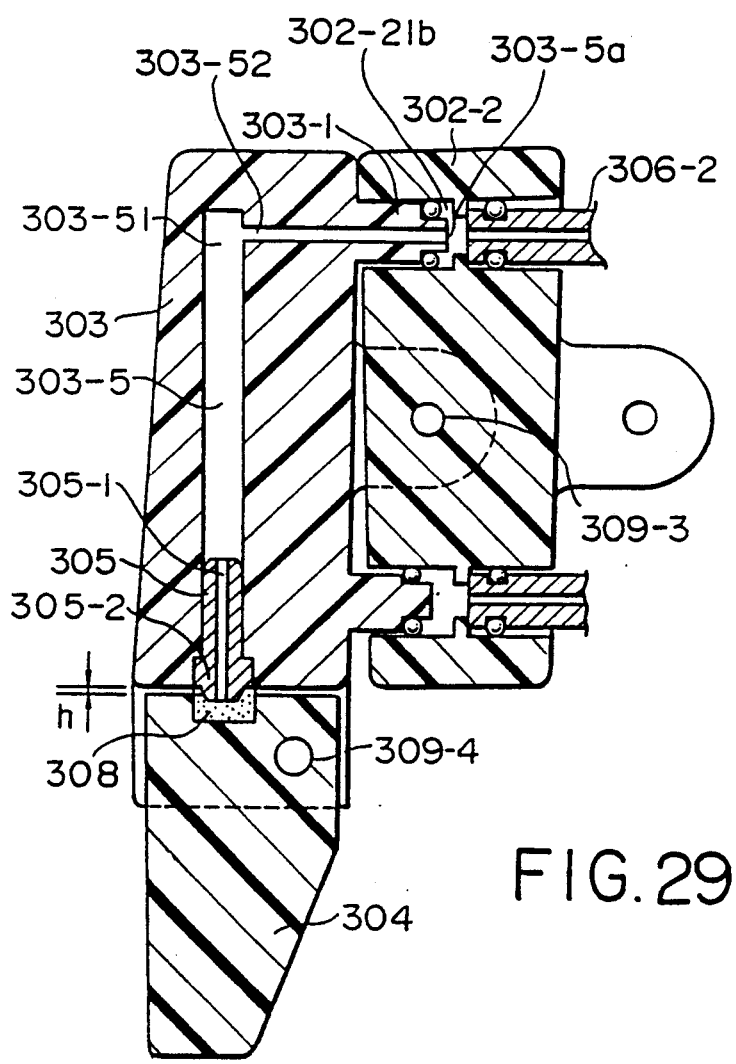
FIG. 29

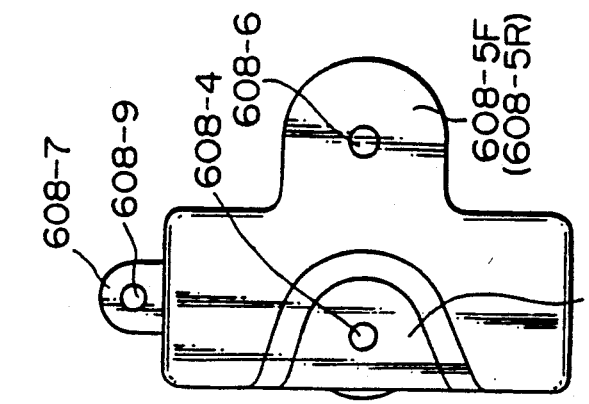
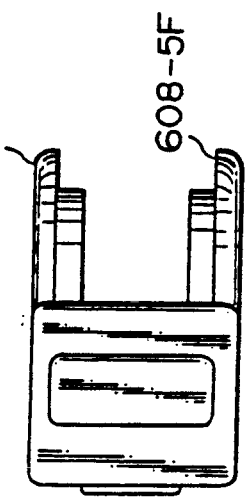
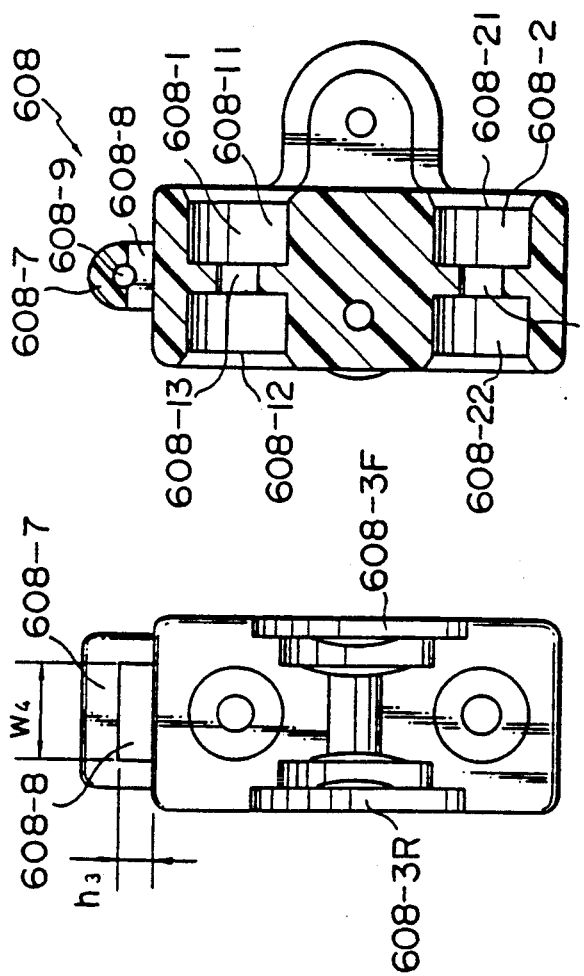

ROBOT FINGER STRUCTURE

This is a continuation of application Ser. No. 07/652,118 filed Feb. 7, 1991, now abandoned.

BACKGROUND OF THE INVENTION

The present invention relates to a robot finger structure suitable for an industrial robot finger.

In recent years, various types of robots for performing jobs instead of human workers have been developed. In a conventional robot finger, a plurality of finger pieces are articulated to be pivotal about their joints by a joint mechanism and are driven by a driving force from a servo motor through a reduction gear mechanism. Therefore, the finger pieces are pivoted in the same direction to pivot a finger.

In this robot finger, since the servo motor and the reduction gear mechanism require a large space, the size of the finger is limited to a certain degree. At the same time, the number of joints is also limited, and fine movements cannot be obtained, thus posing many problems.

In order to solve the above drawbacks, a "robot finger structure" disclosed in Japanese Patent Application No. 57-54966 is proposed. In this "robot finger structure, a plurality of first joints and a plurality of second joints are stacked on each other, and peripheral portions of the first and second joints are magnetized in opposite directions to cause them to attract to each other, thereby pivoting a finger. According to this "robot finger structure", a compact robot finger can be obtained by a simple structure. In addition, a multi-articulated finger can be easily formed, and pivotal motion of the finger can be finely and smoothly performed.

Although the above "robot finger structure" can obtain a compact finger with a simple arrangement, the first and second joints must be made of a magnetic material, thus resulting in high cost. In addition, since an overall weight is increased, the response speed is reduced by an increase in weight. The above robot finger structure cannot be easily assembled or disassembled, and the finger is still structurally complicated.

SUMMARY OF THE INVENTION

It is a principal object of the present invention to provide a robot finger structure at low cost.

It is another object of the present invention to provide a lightweight robot finger structure.

It is still another object of the present invention to provide a robot finger structure having a high response speed.

It is still another object of the present invention to provide a robot finger structure whose assembly and disassembly are facilitated.

It is still another object of the present invention to provide a robot finger structure having a simple structure.

It is still another object of the present invention to provide a robot finger structure capable of recognizing contact with a target object.

In order to achieve the above objects of the present invention, there is provided a robot finger structure comprising a first joint member having a fluid path, a second joint member having a fluid path and pivotally supported by the first joint member while the fluid path of the second joint member communicates with the fluid path of the first joint member, pivotal movement of the second joint member being stopped upon abutment with the first joint member, fluid supply means for supplying a fluid to the fluid path of the first joint member, and a third joint member which is pivotally supported by the second joint member, is pivoted upon reception of a pressure of the fluid supplied to the first and second joint members through the fluid paths, and is brought into contact with the second joint member.

According to the present invention, when a fluid is supplied to the fluid path of the first joint, this fluid is supplied to the third joint through the fluid path of the second joint. Upon reception of a pressure of the fluid, the third joint is pivoted and abuts against the second joint. By this contact between, the third and second joints, the second joint is pivoted and abuts against the first joint.

According to the present invention, the pivoted joints can be returned to their home positions.

According to the present invention, when the fluid is supplied to the fluid path of the first joint, the fluid is supplied to the third joint through the fluid path of the second joint, while the fluid acts on a pressure-receiving surface of the fluid path of the second joint to cause pivotal movement of the second joint. Therefore, the second joint is pivoted by contact with the third joint and the pressure acting thereon, and abuts against the first joint.

BRIEF DESCRIPTION OF THE DRAWINGS

FIG. 1 is a front view of a multi-articulated finger according to an embodiment of the present invention;

FIGS. 2A and 2B are a side view and a front view, respectively, showing a joint unit top used in the multi-articulated finger;

FIGS. 4A and 4B are a front view and a side view, respectively, showing a joint unit end used in the above multi-articulated finger;

FIGS. 5A and 5B are a front view and a side view, respectively, showing a joint unit finger used in the above multi-articulated finger;

FIG. 14 is a front view showing a multi-articulated finger according to still another embodiment of the present invention;

FIG. 16 is a front sectional view of the joint cross unit shown in FIGS. 15A, 15B, and 15C;

FIG. 17 is a partially cutaway front view of a joint unit piston used in the multi-articulated finger shown in FIG. 14;

FIG. 18 is a front view showing a multi-articulated finger according to still another embodiment of the present invention;

FIGS. 28A and 28B are a side view and a front view, respectively, showing a joint unit finger used in multi-articulated finger shown in FIG. 26;

FIG. 29 is a partially cutaway front sectional view showing an assembly state of a joint unit end, a joint unit finger, and a joint unit of the multi-articulated finger shown in FIG. 26;

FIGS. 44A–44D are views showing a stand block used for the clamp mechanism shown in FIG. 43.

DESCRIPTION OF THE PREFERRED EMBODIMENTS

Figure 3A:
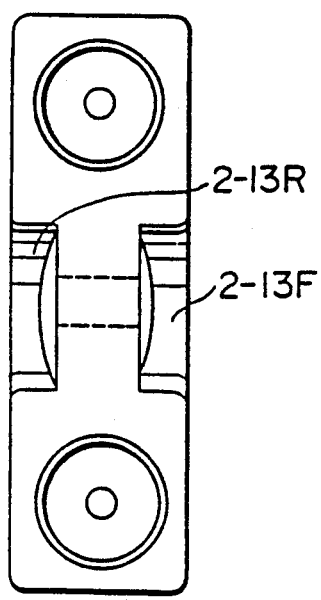
FIGS. 3A, 3B, and 3C are a side view, a front view, and a plan view, respectively, showing the joint unit used in the multi-articulated finger.

Multi-articulated fingers according to the present invention will be described below.

FIG. 1 shows a multi-articulated finger according to an embodiment of the present invention. Referring to FIG. 1, reference numeral 1 denotes a joint unit top; 2-1 and 2-2, joint units; 3, a joint unit end; and 4, a joint unit finger. The joint unit top 1, the joint units 2-1 and 2-2, and the joint unit and 3 are made of polyamide containing glass fibers. The joint unit finger 4 is made of urethane.

As shown in FIGS. 2A and 2B, the joint unit top 1 has a first path 1-1 and a second path 1-2 as fluid paths. Openings 1-11 and 1-21 as one-end openings of the paths 1-1 and 1-2 and openings 1-12 and 1-22 as the other-end openings of the paths 1-1 and 1-2 have large diameters. An outlet path of a small-diameter intermediate path 1-13 in the first path 1-1 is eccentric from the opening center of the other-end opening 1-12. Semicircular recessed steps 1-3F and 1-3R are respectively formed on the front and rear surface sides of the joint unit top 1. A through hole 1-4 is formed in the central portions of the recessed steps 1-3F and 1-3R. In this embodiment, the second path 1-2 is not used as the fluid path.

Figure 3B:
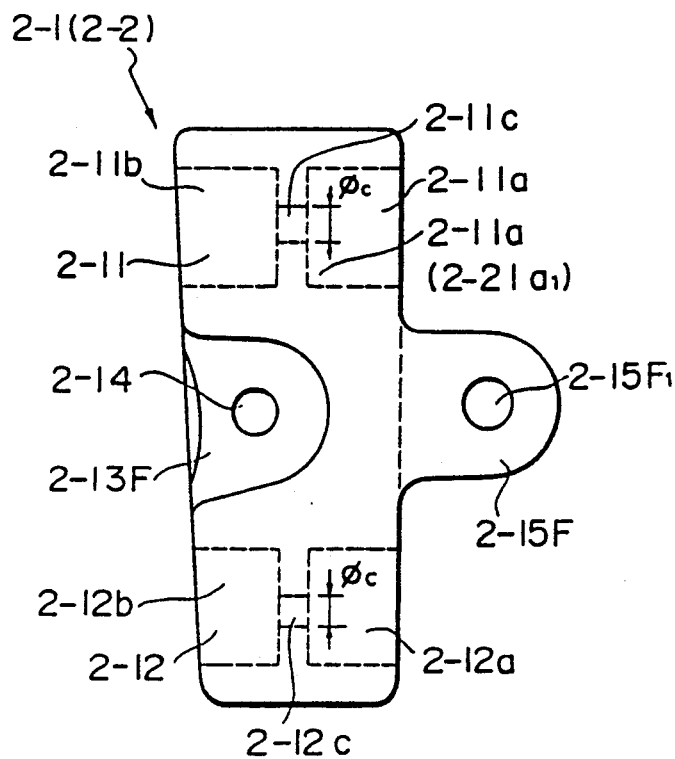
Figure 3C:
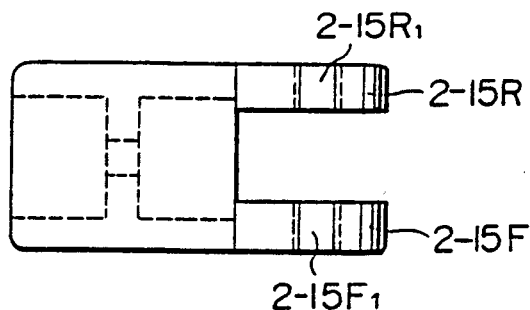

As shown in FIGS. 3A, 3B, and 3C, the joint unit 2-1 has a first path 2-11 and a second path 2-12. In this joint unit 2-1, openings 2-11a and 2-12a as one-end openings of the paths 2-11 and 2-12 and openings 2-11b and 2-12b as the other-end openings have large diameters. More specifically, in the first path 2-11, the one-end opening 2-11a and the other-end openings 2-11b communicate with each other through a small-diameter intermediate path 2-11c. In the second path 2-12, the one-end opening 2-12a and the other-end opening 2-12b communicate with each other through a small-diameter intermediate path 2-12c. Semicircular recessed steps 2-13F and 2-13R are respectively formed on the front and rear surfaces of the joint unit 2-1. A through hole 2-14 is formed through the recessed steps 2-13F and 2-13R. Semicircular collar surface portions 2-15F and 2-15R extending laterally are respectively formed on the front and rear surfaces of the joint unit 2-1. Through holes 2-15F1 and 2-15R1 are formed in the central portions of the collar surface portions 2-15F and 2-15R, respectively The second path 2-12 is not used in the flow path.

The joint unit 2-2 and the joint unit 2-1 are identical parts.

As shown in FIGS. 4A and 4B, laterally extending bosses 3-1 and 3-2 are formed on the joint unit end 3. Semicircular collar surface portions 3-3F and 3-3R extending laterally are formed on the front and rear surfaces of-the joint unit end 3. Through holes 3-3F1 and 3-3R1 are formed in the central portions of the collar surface portions 3-3F and 3-3R, respectively. Rectangular collar surface portions 3-4F and 3-4R extending downward are respectively formed on the front and rear surfaces of the joint unit end 3. Through holes 3-4F1 and 3-4R1 are formed in the collar surface portions 3-4F and 3-4R, respectively.

As shown in FIGS. 5A and 5B, the joint unit finger 4 has a convex step 4-2 having a through hole 4-3 in the upper portion of an arcuated pawl 4-1.

Figure 6:
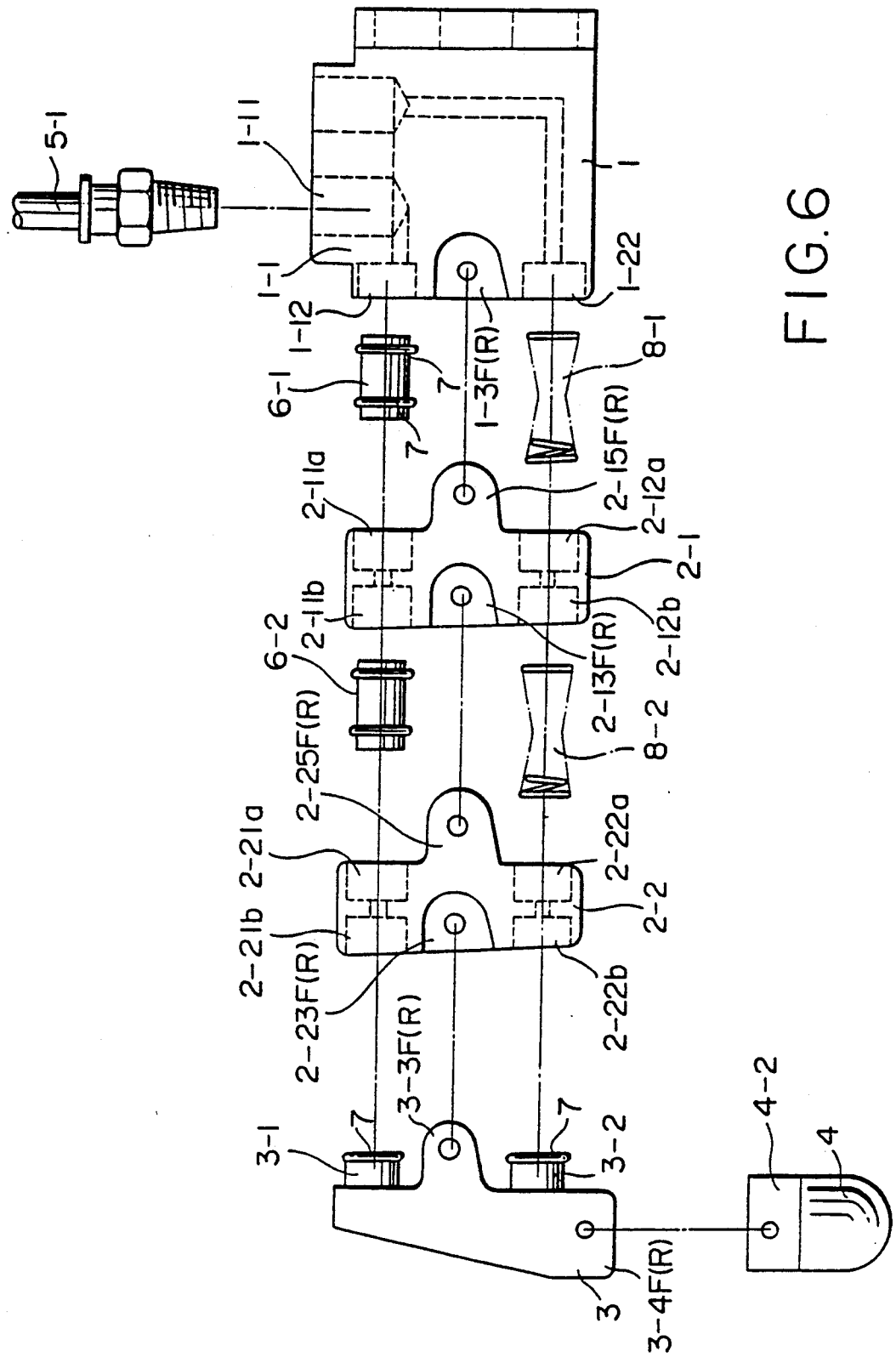
FIG. 6 is an exploded view of the above multi-articulated finger.

FIG. 6 is an exploded view of a multi-articulated finger 10. An assembly operation of the multi-articulated finger 10 will be described with reference to FIG. 6.

The joint unit top 1 is fixed on a robot body (not shown). An air pipe 5-1 is connected to the one-end opening 1-11 of the first path 1-1. The collar surface portions 2-15F and 2-15R of the joint unit 2-1 are respectively inserted into the recessed steps 1-3F and 1-3R of the joint unit top 1, and a pin 9-1 is inserted into the mating through holes. The joint unit 2-1 is pivotally supported on the joint unit top 1 so that the pivotal movement of the joint unit 2-1 is regulated by the joint unit top 1. In this case, joint unit pistons 6-1 having O-rings and compression coil springs 8-1 are inserted between the other-end openings 1-12 nd 1-22 of the joint unit top 1 and the one-end openings 2-11a and 2-12a of the joint unit 2-1, respectively.

Figure 7:
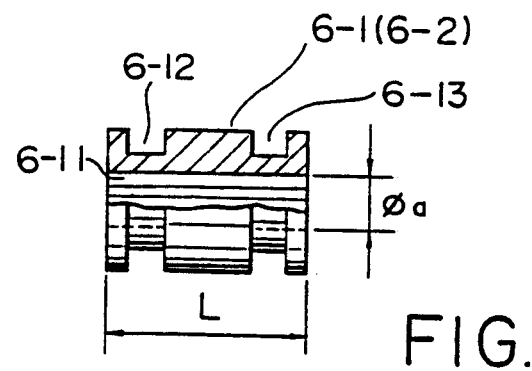
FIG. 7 is a partially cutaway side view of a joint unit piston used in the above multi-articulated finger.

FIG. 7 shows the joint unit piston 6-1. The joint unit piston 6-1 has a path 6-11 extending in its axial direction. An inner diameter $\Phi a$ of the path 6-11 is set to be equal to a path diameter $\Phi b$ (FIG. 2B) of the intermediate paths 1-13 and 1-23 of the joint unit top 1 or a path diameter $\Phi c$ (FIG. 3B) of the intermediate paths 2-11c and 2-12c of the joint unit 2-1. In a state shown in FIG. 1, a length L of the joint unit piston 6-1 is large, so that opposite outer wall surfaces of the joint unit top 1 and the joint unit 2-1 have a small gap. That is, the intermediate path 1-13 of the joint unit top 1 and the intermediate path 2-11c of the joint unit 2-1 communicate or can communicate with each other through the path 6-11 of the joint unit piston 6-1. Recessed grooves 6-12 and 6-13 are formed on the outer circumferential surface portions at both ends of the joint unit piston 6-1 so as to mount O-rings 7 on these portions. The compression coil spring 8-1 applies a biasing force to the joint unit 2-1 in a state shown in FIG. 1.

Collar surface portions 2-25F and 2-25R of the joint unit 2-2 are respectively inserted into the recessed steps 2-13F and 2-13R of the joint unit 2-1, and a pin 9-2 is inserted into the mating through holes. The joint unit 2-2 is pivotally supported by the joint unit 2-1 so that pivotal movement of the joint unit 2-2 is regulated by the joint unit 2-1. In this case, joint unit pistons 6-2 having O-rings 7 and compression coil springs 8-2 are inserted between the other-end openings 2-1b and 2-12b of the joint unit 2-1 and one-end openings 2-21a and 2-22a of the joint unit 2-2, respectively. The joint unit pistons 6-1 and 6-2 are identical parts, and the compression coil springs 8-1 and 8-2 are also identical parts. In the state shown in FIG. 1, the opposite outer wall surfaces of the joint unit 2-1 and the joint unit 2-2 have a small gap therebetween, and the compression coil springs 8-2 apply biasing forces to the joint unit 2-2 in the same manner as described above. The intermediate path 2-11c of the joint unit 2-1 and an intermediate path 2-21c of the joint unit 2-2 can communicate with each other through a path 6-21 of the joint unit piston 6-2.

The collar surface portions 3-3F and 3-3R of the joint unit end 3 are respectively inserted into recessed steps 2-23F and 2-23R of the joint unit 2-2, and a pin 9-3 is inserted into the mating through holes. The joint unit end 3 is pivotally supported by the joint unit 2-2 so that pivotal movement of the joint unit end 3 is regulated by the joint unit 2-2. In this case, the other-end openings 2-21b and 2-22b of the joint unit 2-2 are kept closed by the bosses 3-1 and 3-2 mounted with O-rings 7.

The convex step 4-2 of the joint unit finger 4 is inserted between the collar surface portions 3-4F and 3-4R of the joint unit end 3, and a pin 9-4 is inserted into the mating through holes. The joint unit finger 4 is pivotally supported by the joint unit end 3 so that pivotal movement of the joint unit finger 4 is regulated by the outer wall surface of the joint unit end 3.

An operation of the multi-articulated finger 10 having the above structure will be described below.

Figure 8:
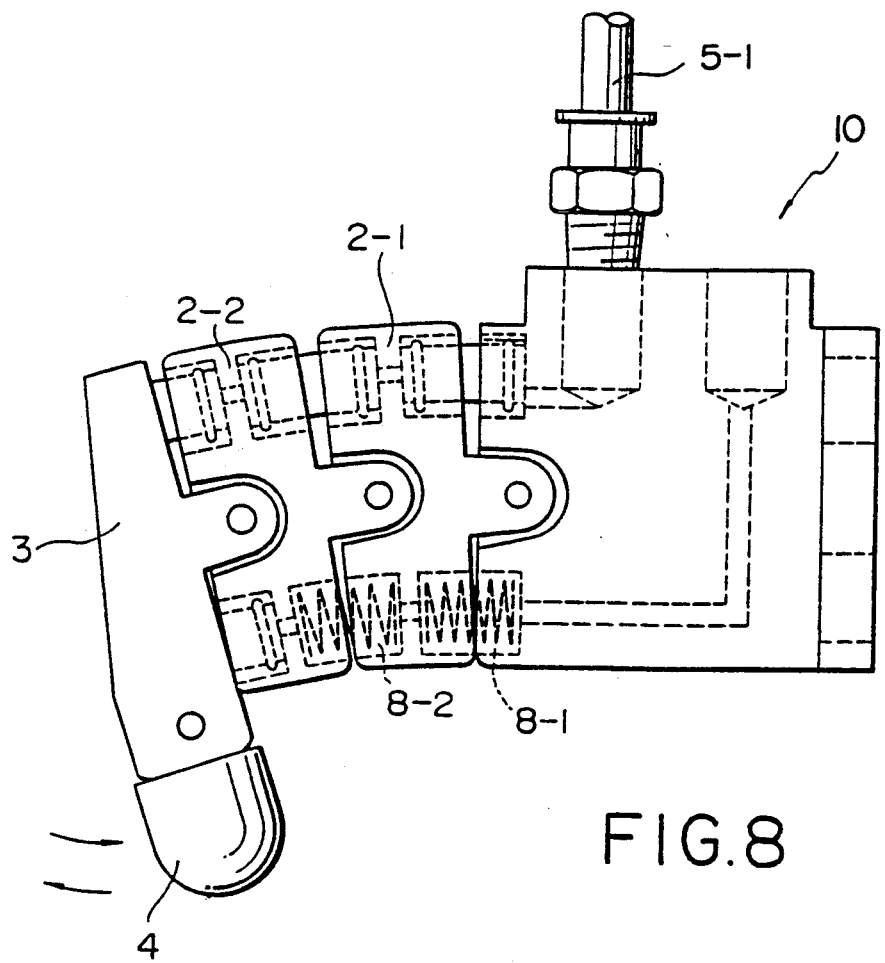
FIG. 8 is a front view showing an operating state of the above multi-articulated finger.

In the state shown in FIG. 1, when compressed air is supplied from the air pipe 5-1 to the path 1-1 of the joint unit top 1, the air is supplied to the other-end opening 1-12 through the intermediate path 1-13. The compressed air supplied to the other-end opening 1-12 acts on a flange surface of the joint unit piston 6-1, and a force is then transmitted to a bottom wall surface 2-11a1 (FIG. 3B) of the one-end opening 2-11a of the joint unit 2-1. By using the bottom wall surface 2-11a1 as a pressure-receiving surface, the joint unit 2-1 is pivoted about the pin 9-1 counterclockwise against the biasing force of the compression coil spring 8-1. On the other hand, the compressed air supplied to the other-end opening 1-12 of the joint unit top 1 is supplied to the other-end opening 2-21b of the joint unit 2-2 through the path 6-11 of the joint unit piston 6-1, the intermediate path 2-11c of the joint unit 2-1, the path 6-21 of the joint unit piston 6-2, and the intermediate path 2-21c of the joint unit 2-2. The compressed air supplied to the other-end opening 2-21b is supplied to the joint unit end 3 using the distal end face of the boss 3-1 (including the O-ring 7) because the other-end opening 2-21b is closed by the boss 3-1 of the joint unit end 3. The joint unit end 3 is pivoted about the pin 9-3 counterclockwise. When the joint unit end 3 is pivoted and its outer surface is brought into contact with the outer wall surface of the joint unit 2-2, the joint unit 2-2 is pivoted counterclockwise as it is urged by the outer wall surface of the joint unit end 3. That is, the joint unit 2-2 is pivoted about the pin 9-2 counterclockwise against the biasing force of the compression coil spring 8-2. In this case, a gap between the outer wall surfaces of the joint units 2-1 and 2-2 which sandwich the piston 6-2 therebetween is increased. The compressed air supplied to the other-end opening 2-11b in the joint unit 2-1 acts on the flange surface of the joint unit piston 6-2, so that the force is transmitted to a bottom wall surface 2-21a1 of the one-end opening 2-21a of the joint unit 2-2. More specifically, the joint unit 2-2 receives a counterclockwise rotational force, i.e., a pressure received on the pressure-receiving surface of the bottom wall surface 2-21a1. The joint unit 2-2 is pivoted counterclockwise by a sum of abutment with the joint unit end 3 and the pressure received by the joint unit 2-2. When the outer wall surface of the joint unit 2-2 abuts against the outer wall surface of the joint unit 2-1, an abutment force with the joint unit 2-2 is added to its pressure reception force to assist counterclockwise rotation of the joint unit 2-2 until pivotal movement of the joint unit 2-1 is regulated by the outer wall surface of the joint unit top 1. FIG. 8 shows an operating state of this multi-articulated finger 10. When supply of the compressed air from the air pipe 5-1 is stopped at an appropriate timing, the joint units 2-1 and 2-2 are returned clockwise by the return forces of the compression coil springs 8-1 and 8-2. As a result, the joint units 2-1 and 2-2 are automatically returned to the home positions, i.e., to the state shown in FIG. 1.

In this embodiment, in the multi-articulated finger 10, the joint unit finger 4 is moved in cooperation with the joint unit end 3. When arcuated movement of the joint unit finger 4 is utilized, a job such as gripping of a target object can be performed. That is, in the multi-articulated finger 10 of this embodiment, a compact, simple structure can be obtained without using a magnetic material. In addition, a large number of identical parts can be used, thus resulting in low cost. The multi-articulated finger can be made light in weight as a whole, and the response speed can be increased. Furthermore, assembly and disassembly can be facilitated, and the finger can be simple from the structural viewpoint.

Figure 9:
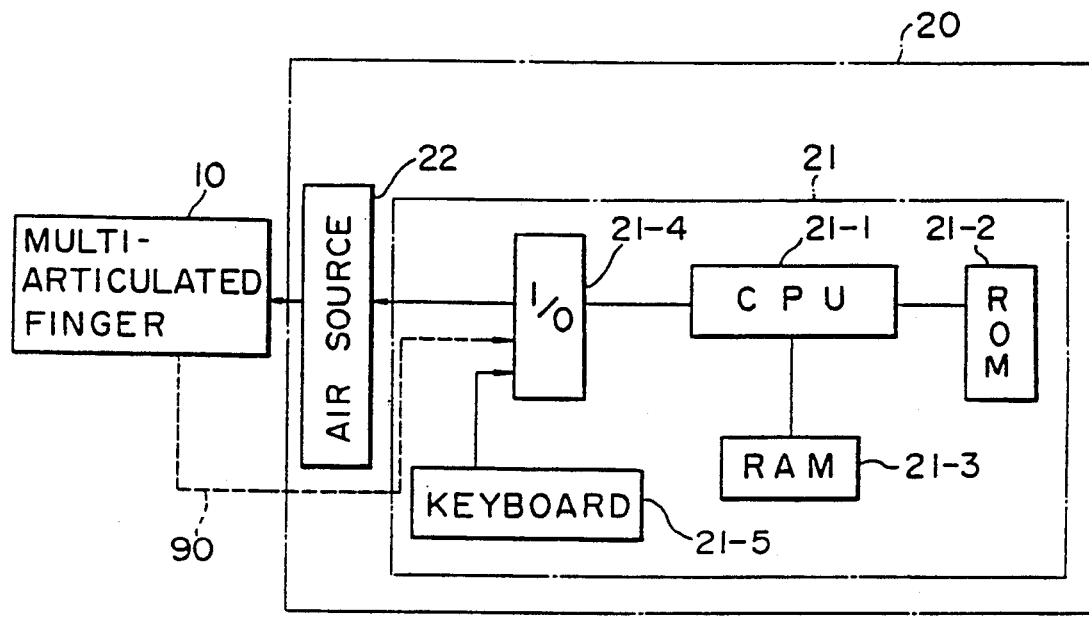
FIG. 9 is a schematic block diagram showing a unit for supplying compressed air to the above multi-articulated finger.

FIG. 9 shows a unit for supplying compressed air to the multi-articulated finger 10. This compressed air supply unit 20 comprises a CPU 21-1, a ROM 21-2, a RAM 21-3, an I/0 port 21-4, and a keyboard 21-5, and a compressed air source 22. The compressed air supply unit 20 controls an amount of air supplied to the air pipe 5-1 and a supply timing.

Figure 10:
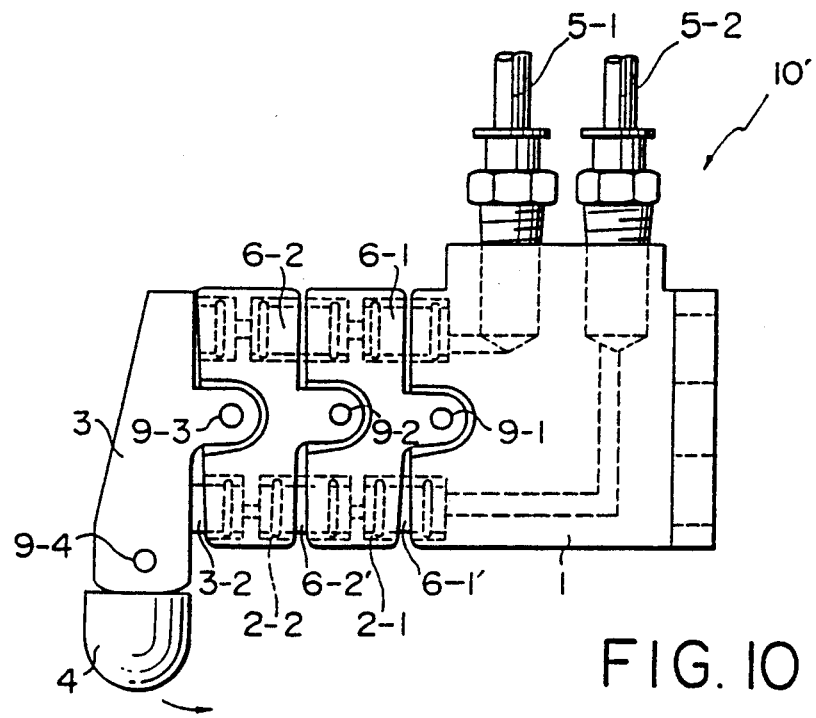
FIG. 10 is a front view showing a multi-articulated finger according to another embodiment of the present invention.
Figure 11:
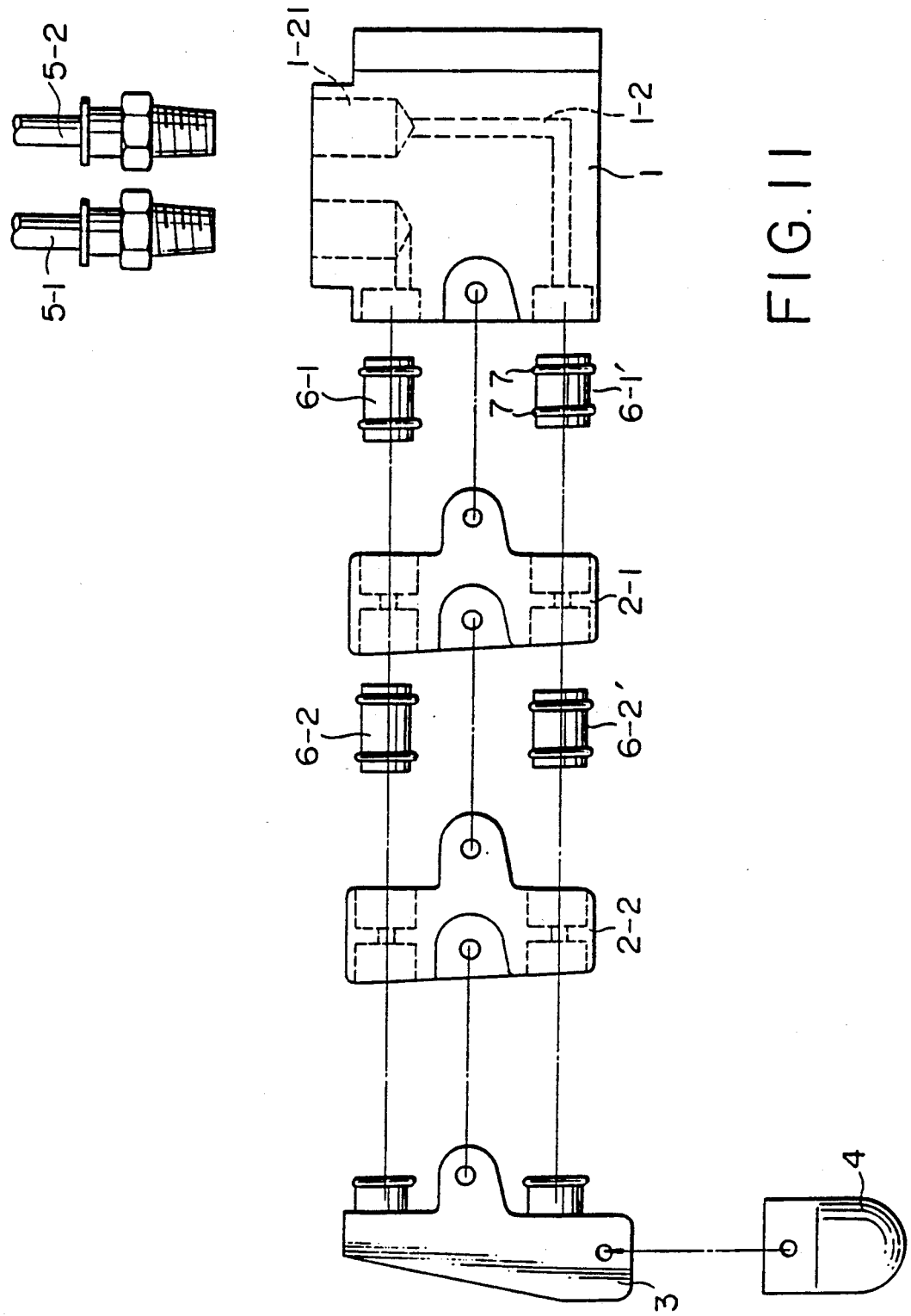
FIG. 11 is an exploded view of the multi-articulated finger shown in FIG. 10.
Figure 12:
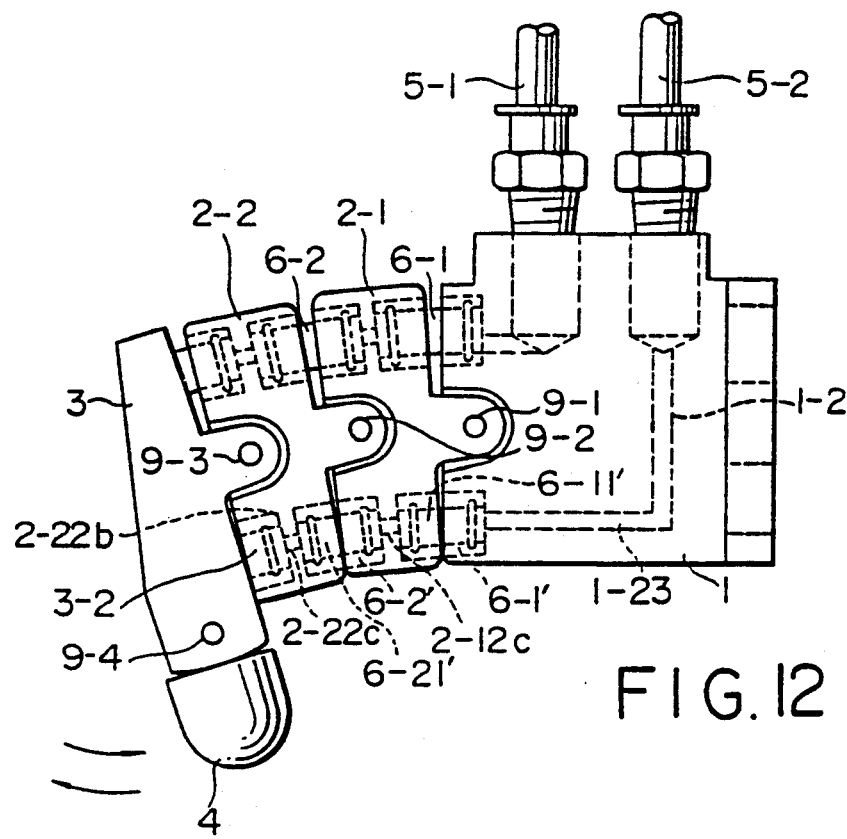
FIG. 12 is a front view showing an operating state of the multi-articulated finger shown in FIG. 10.

FIG. 10 shows a multi-articulated finger according to another embodiment of the present invention. The same reference numerals as in FIG. 1 denote the same parts in FIG. 10, and a detailed description thereof will be omitted. In this multi-articulated finger 10', as shown in the exploded view of FIG. 11, joint unit pistons 6-1' and 6-2' shorter than the joint unit pistons 6-1 and 6-2 are used in place of the compression coil springs 8-1 and 8-2. An air pipe 5-2 is connected to a one-end opening 1-21 of a second path 1-2 of a joint unit top 1. In the multi-articulated finger 10' having the above structure, even if compressed air from an air pipe 5-1 is interrupted in an operating state shown in FIG. 12, joint units 2-1 and 2-2 and a joint unit end 3 are not automatically returned to the home positions. In order to return the joint units 2-1 and 2-2 and the joint unit end 3 to the home positions, the compressed air is supplied from the air pipe 5-2 while supply of the compressed air from the air pipe 5-1 is kept interrupted.

More specifically, when the compressed air is supplied from the air pipe 5-2 to the path 1-2 of the joint unit top 1, this compressed air is supplied to the other-end opening 2-22b of the joint unit 2-2 through an intermediate path 1-23, a path 6-11' of the joint unit piston 6-1', an intermediate path 2-12c of the joint unit 2-1, a path 6-21, of the joint unit piston 6-2' and an intermediate path 2-22c of the joint unit 2-2. The compressed air supplied to the other-end opening 2-22b acts on the joint unit end 3 using a distal end face of a boss 3-2 (including an O-ring 7) as a 2-22b is closed by the boss 3-2 of the joint unit end 3. The joint unit end 3 is pivoted about a pin 9-3 clockwise. When the joint unit end 3 is pivoted and its outer wall surface is brought into contact with the outer wall surface of the joint unit 2-2, the joint unit 2-2 is urged toward the outer surface wall of the joint unit end 3, so that the joint unit 2-2 is pivoted about a pin 9-2 clockwise. When the joint unit 2-2 is brought into contact with the joint unit 2-1 through a joint unit piston 6-2, the joint unit 2-1 is pivoted about a pin 9-1 clockwise. When the joint unit 2-1 is brought into contact with the joint unit top 1 through a joint unit piston 6-1, the joint units 2-1 and 2-2 and the joint unit end 3 are returned to the home positions shown in FIG. 10. Note that although the joint units 2-1 and 2-2 and the joint unit end 3 are pivoted by abutment with adjacent joint unit members and pressures acting thereon, a detailed description thereof has been omitted.

In each of the above embodiments, an outlet path of an intermediate path 1-13 of a first path 1-1 in the joint unit top 1 is eccentric from the opening axis of the other-end opening 1-12. However, the outlet path may be aligned with the opening axis of the other-end opening 1-22.

In each of the above embodiments, the pressure-receiving surfaces are formed in the fluid paths of the joint units 2-1 and 2-2. However, these pressure-receiving surfaces need not be formed.

Figure 13:
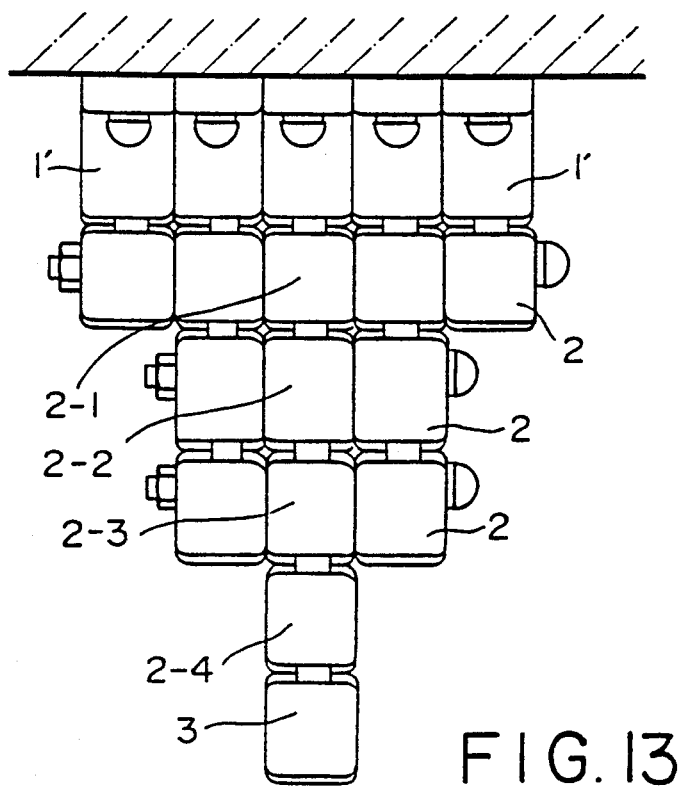
FIG. 13 is a plan view showing a state wherein the multi-articulated finger as a basic assembly is reinforced.
Figures 15A, 15B:
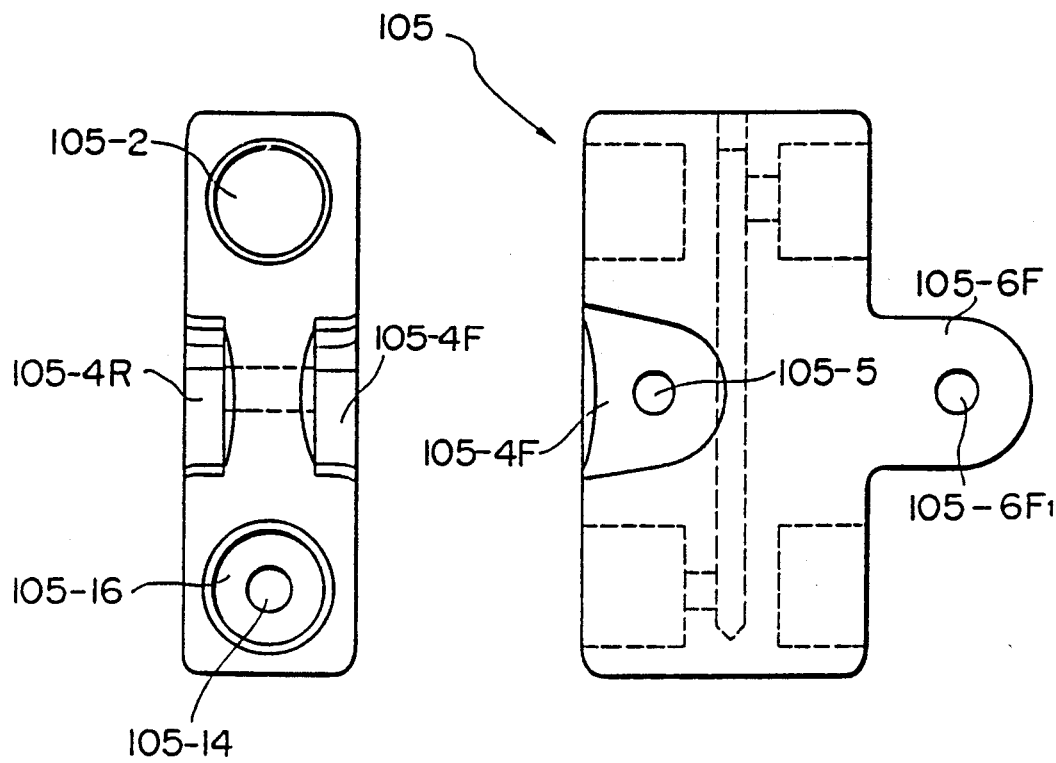
FIGS. 15A, 15B, and 15C are a side view, a front view, and a plan view, showing a joint cross unit used in the multi-articulated finger shown in FIG. 14.
Figure 15C:
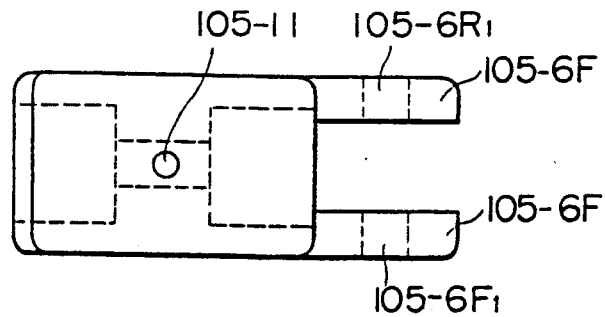

In each of the above embodiments, two joint units are combined. However, three or more joint units may be combined to increase an arcuated displacement stroke of a joint unit finger 4, and the number of joints can be increased to perform a finer movement. In this case, as shown in FIG. 13, it is preferable that a large number of joint units 2 are combined at both sides of the multi-articulated joint units 2-1 and 2-2 and a multi-articulated joint unit 2-3 to reinforce the multi-articulated finger. In the arrangement shown in FIG. 13, reinforcement is performed in the joint unit 2-1 to endure a torque of 15 kg so as to obtain a torque of 3 kg at the joint unit end 3.

Two or more joint units need not be combined. Only one joint unit may be used. More specifically, a structure obtained by eliminating the joint unit 2-1 from the structure shown in each of FIGS. 1 and 10 may be employed. In this case, the joint unit top 1 corresponds to the first joint, the joint unit 2-2 corresponds to the second joint, and the joint unit end 3 corresponds to the third joint.

In the embodiment shown in FIG. 1, when the compressed air is supplied from the air pipe 5-1, the outer wall surface of the joint unit end 3 is brought into contact with the joint unit 2-2. However, the outer wall surface of the joint unit end 3 may be brought into contact with the joint unit 2-2 through the boss 3-2. In the embodiment shown in FIG. 10, when the compressed air is supplied from the air pipe 5-1, the outer wall surface of the joint unit end 3 abuts against the joint unit 2-2, the outer wall surface of the joint unit 2-2 abuts against the outer wall surface of the joint unit 2-1, and the outer wall surface of the joint unit 2-1 abuts against the outer wall surface of the joint unit top 1. However, the joint unit end 3 may abut against the joint unit 2-2 through the boss 3-2, the joint unit 2-2 may abut against the outer wall surface of the joint unit 2-1 through the joint unit piston 6-2', and the outer wall surface of the joint unit 2-1 may abut against the outer wall surface of the joint unit top 1 through the joint unit piston 6-1'.

FIG. 14 shows a multi-articulated finger according to still another embodiment of the present invention.

Reference numeral 105 denotes a joint cross, unit inserted between joint units 102-2 and 102-3. As shown in FIGS. 15A, 15B, and 15C and FIG. 16, the joint cross unit 105 has a path 105-1 serving as a fluid outflow path. The path 105-1 is constituted by a longitudinal path 105-12 whose upper opening is closed by a cock 105-11, small-diameter lateral paths 105-13 and 105-14 respectively communicating with the upper and lower ends of the longitudinal path 105-12, and a one-end large-diameter opening 105-15 and the other-end large-diameter opening 105-16 which respectively communicate with the lateral paths 105-13 and 105-14. Openings 105-2 and 105-3 which do not communicate with the longitudinal path 105-12 and having the same diameters as those of the one-end opening 105-15 and the other opening 105-16 are formed on the surface of the joint cross unit 105 at a position opposite to the openings 105-15 and 105-16. Semicircular recessed steps 105-4F and 105-4R are formed on the front and rear surfaces of the joint cross unit 105. A through hole 105-5 extends through the recessed steps 105-4F and 105-4R. Semicircular collar surface portions 105-6F and 105-6R extending laterally are formed on the front and rear surfaces of the joint cross unit 105. Through holes 105-6F1 and 105-6R1 are formed in the central portions of the collar surface portions 105-6F and 105-6R, respectively.

An operation of a multi-articulated finger 111 having the above structure will be described below.

In a state shown in FIG. 14, when compressed air is supplied from an air pipe 110-1 to a path 101-1 of a joint unit top 101, the compressed air is supplied to the other-end opening 101-12 through an intermediate path 101-13. The compressed air supplied to the other-end opening 101-12 acts on a flange surface of a joint unit piston 106-1, and a joint unit 102-1 is pivoted about a pin 109-1 counterclockwise against a biasing force of a compression coil spring 108-1. On the other hand, the compressed air supplied to the other-end opening 101-12 of the joint unit top 101 is supplied to the path 105-1 of the joint cross unit 105 through a path 106-11 of the joint unit piston 106-1, an intermediate path 102-11c of the joint unit 102-1, a path 106-21 of a joint unit piston 106-2, an intermediate path 102-21c of the joint unit 102-2, and a path 106-31 of a joint unit piston 106-3. The compressed air supplied to the path 105-1 of the join cross unit 105 acts on the joint cross unit 105 using the side wall of the longitudinal path 105-12 of the path 105-1 as a pressure-receiving surface. The joint cross unit 105 is pivoted about a pin 109-3 counterclockwise against a biasing force of a compression coil spring 108-3. That is, the joint cross unit 105 receives the compressed air toward one side and is pivoted counterclockwise when the pivot point is regarded as the center point. When the joint cross unit 105 is pivoted and its outer wall surface abuts against the outer wall surface of the joint unit 102-2, the wall surface of the joint unit 102-2 is urged by the outer wall surface of the joint cross unit 105, and the joint unit 102-2 is pivoted counterclockwise. That is, the joint unit 102-2 is pivoted about a pin 109-2 counterclockwise against the biasing force of a compression coil spring 108-2. At this time, the gap between the outer wall surfaces of the joint units 102-1 and 102-2 which sandwich the joint unit piston 106-2 therebetween is increased. The compressed air supplied to the other-end opening 102-11b in the joint unit 102-1 acts on a flange surface of the joint unit piston 106-2. The joint unit 102-2 receives the counterclockwise rotational force and the pressure acting thereon. The joint unit 102-2 is further pivoted counterclockwise by a sum of abutment with the joint cross unit 105 and the pressure acting thereon. When the outer wall surface of the joint unit 102-2 abuts against the outer wall surface of the joint unit 102-1, the pressure acting thereon is added to abutment with the joint unit 102-2. The joint unit 102-2 assists counterclockwise rotation of the joint unit 102-1 until the outer wall surface of the joint unit 102-1 is brought into contact with and regulated by the outer wall surface of the joint unit top 101.

The compressed air supplied to the path 105-1 of the joint cross unit 105 is supplied to the lateral path 105-14 communicating with the longitudinal path 105-12. The joint cross unit 105 causes the compressed air supplied through the flow paths of the joint units 102-1 and 102-2 to flow from the other side with respect to the pivot position as the center position through the path 105-1. The compressed air flowing out through this lateral path 105-14 is supplied to the other-end opening 102-41b of a joint unit 102-4 through a path 106-41 of a joint unit piston 106-4, an intermediate path 102-31c of the joint unit 102-3, a path 106-51 of a joint unit piston 106-5, and an intermediate path 102-41c of the joint unit 102-4. The compressed air supplied to the other-end opening 102-41b acts on a joint unit end 103 using a distal end face of a boss 103-2 (including an O-ring 107) as a pressure-receiving surface since the other-end opening 102-41b is closed by the boss 103-2 of the joint unit end 103. In this case, the joint unit end 103 is pivoted about a pin 109-6 clockwise. When the joint unit end 103 is pivoted and its outer end surface is brought into contact with the outer wall surface of the joint unit 102-4, the joint unit 102-4 is urged by the outer wall surface of the joint unit end 103 to pivot the joint unit 102-4 clockwise. That is, the joint unit 102-4 pivots about a pin 109-5 clockwise against a biasing force of a compression coil spring 108-5. At this time, a gap between the opposite outer wall surfaces of the joint units 102-3 and 102-4 which sandwich the joint unit piston 106-5 is increased, and the compressed air supplied to the other-end opening 102-31b in the joint unit 102-3 acts on a flange surface of the joint unit piston 106-5. A clockwise rotational force, i.e., the pressure acting on the joint unit 102-4 is applied thereto. The joint unit 102-4 is further pivoted clockwise by a sum of abutment with the joint unit end 103 and the pressure acting thereon. When the joint unit 102-4 is brought into contact with the outer wall surface of the joint unit 102-3, the joint unit 102-3 is pivoted about a pin 109-4 clockwise against a biasing force of a compression coil spring 108-4 by the sum of abutment with the joint unit 102-4 and the pressure acting thereon. When the movement of the joint unit 102-3 is observed from a different viewpoint, when the pressure in the path 102-31 is increased, the joint unit 102-3 is pivoted clockwise, and its pivotal movement is regulated when its outer wall surface is brought into contact with the outer wall surface of the joint cross unit 105.

An operating state of the multi-arcuated finger 111 is shown in FIG. 17.

When supply of the compressed air from an air pipe 510-1 is interrupted at an appropriate timing, the joint units 102-1 to 102-4 and the joint cross unit 105 are returned by return forces of the compression coil springs 108-1 to 108-5. As a result, the joint units 102-1 to 102-4 and the joint cross unit 105 are automatically returned to the home positions, i.e., to the state shown in FIG. 1.

In the multi-articulated finger 11 of this embodiment, while the joint units 102-1 and 102-2, and the joint cross unit 105 are pivoted counterclockwise, the joint units 102-3 and 102-4, and the joint unit end 103 are pivoted in an opposite direction, i.e., clockwise. The finger as a whole is pivoted in a substantially S shape. For this reason, a joint unit finger 104 can be moved downward almost linearly in cooperation with the joint unit end 103. Therefore, the multi-articulated finger of this embodiment is suitable for various jobs which require linear movements.

In the above embodiment, joint unit pistons having lengths L smaller than those of the joint unit pistons 106 may be used in place of the compression coil springs 108-1 to 108-5. In this case, an air pipe is connected to a second path 101-2 of the joint unit top 101 to interrupt supply of the compressed air from the air pipe 110-1, and the compressed air is supplied from the air pipe connected to the path 101-2. Note that another fluid outflow path may be arranged in an air pipe connected to the path 101-2 in the joint cross unit 105.

FIG. 18 is a multi-articulated finger according to still another embodiment of the present invention.

A joint unit top 201 in FIG. 18 has a first path 201-1 and a second path 201-2 as fluid paths. In the joint unit top 201, an outer wall surface 201-5 which faces the other-end openings 201-12 and 201-22 is constituted by an inclined surface whose upper portion extends to the left (FIG. 3B) farther than the lower portion.

A joint unit 202-2 and a joint unit 202-1 are identical parts.

A length L of a joint unit piston 206-1 is larger than that of a joint unit piston 206-1', so that a small gap is formed between the opposite outer surface walls of the joint unit top 201 and the joint unit 202-1 in a state shown in FIG. 1. That is, an intermediate path 201-13 of the joint unit top 201 and an intermediate path 202-13c of the joint unit 202-1 communicate with each other through a path 206-11 of the joint unit piston 206-1. Recessed grooves 206-12 and 206-13 are formed on the outer circumferential portions at both ends of the joint unit piston 206-1 so as to mount O-rings 207 thereon. On the other hand, the joint unit piston 206-1' has a shape identical to the joint unit piston 206-1, but has a length L smaller than that of the joint unit piston 206-1. An intermediate path 201-23 of the joint unit top 201 and an intermediate path 202-12c of the joint unit 202-1 can communicate with a path 206-11' of the joint unit piston 206-1'.

Joint unit pistons 206-2 and 206-2' mounted with O-rings 207 are inserted between the other-end openings 202-11b and 202-12b of the joint unit 202-1 and one-end openings 202-21b and 202-22b of the joint unit 202-2.

Joint unit pistons 206-3 and 206-3' mounted with O-rings 207 are arranged between the other-end openings 202-21b and 202-22b of the joint unit 202-2 and boss holes 203-1 and 203-2 of a joint unit end 203.

The joint unit pistons 206-1, 206-2 and 206-3 are identical parts, and the joint unit pistons 206-1' and 206-2' and a joint unit piston 206-3' are also identical parts. In a state in FIG. 18, small gaps are formed between the opposite outer surfaces between the joint units 202-1 and 202-2 and between the opposite outer wall surfaces between the joint unit 202-2 and the joint unit end 203, respectively. An intermediate path 202-11c of the join unit 202-1 and an intermediate path 202-21c of the joint unit 202-2 can communicate with each other through a path 206-21 of the joint unit piston 206-2. An intermediate path 202-12c of the joint unit 202-1 and an intermediate path 202-22c of the joint unit 202-2 can communicate with each other through a path 206-21' of the joint unit piston 206-2'.

An operation of a multi-articulated finger 10 having the above structure will be described below.

Referring to FIG. 18, assume that compressed air is supplied to the path 201-2 of the joint unit top 201 and that a multi-articulated finger 210 is operated, as shown in FIG. 18. In this case, when supply of compressed air to the path 201-2 is interrupted and compressed air is supplied to the path 201-1, this compressed air is supplied to a bottom wall surface 203-11 of the boss hole 203-1 of the joint unit end 203 through the intermediate path 201-13, a path 206-11 of the joint unit piston 206-1, the intermediate path 202-11c of the joint unit 202-1, the path 206-21 of the joint unit piston 206-2, the intermediate path 202-21c of the joint unit 202-2, and a path 206-31 of the joint unit piston 206-3. That is, the compressed air acts on the joint unit end 203 by using a bottom wall surface 203-11 of the boss hole 203-1 as a pressure-receiving surface. The joint unit end 203 is pivoted about a pin 209-3 counterclockwise. When the joint unit end 203 is pivoted and its outer wall surface is brought into contact with the outer wall surface of the joint unit 202-2, the joint unit end 203 is urged by the outer wall surface of the joint unit end 203, and the joint unit 202-2 is pivoted counterclockwise. At this time, a gap between the opposite outer wall surfaces of the joint units 202-1 and 202-2 which sandwich the joint unit piston 206-2 is increased. The compressed air supplied to the other-end opening 202-11b in the joint unit 202-1 acts on a flange surface of the joint unit piston 206-2. A counterclockwise rotational force, i.e., a pressure acting on the joint unit 202-2, acts on the joint unit 202-2. The joint unit 202-2 is pivoted counterclockwise by a sum of abutment with the joint unit end 203 and the pressure acting thereon. When the outer wall surface of the joint unit 202-2 and the outer wall surface of the joint unit 202-1 are brought into contact with each other, the joint unit 202-1 is pivoted counterclockwise by a sum of abutment with the joint unit 202-2 and the pressure acting thereon. The outer wall surface of the joint unit 201-1 abuts against the outer wall surface of the joint unit top 201 and is stopped thereby.

Figure 19:
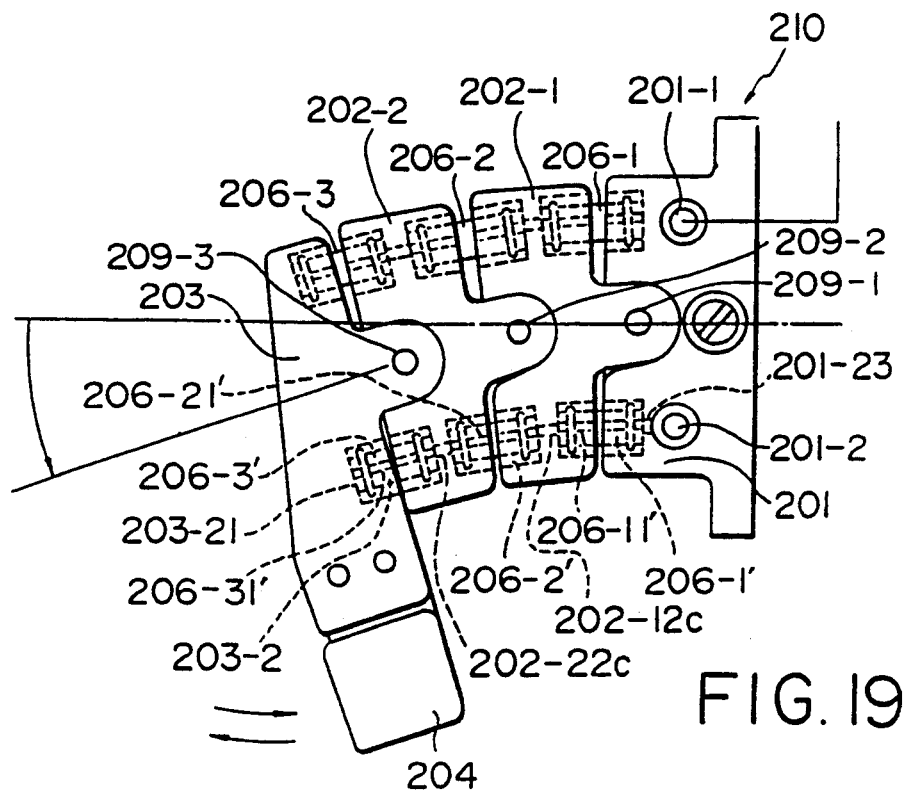
FIG. 19 is a front view showing an operating state of the multi-articulated finger shown in FIG. 18.

An operating state of the multi-articulated finger 210 is shown in FIG. 19.

When supply of the compressed air to the path 201-1 of the joint unit top 201 is interrupted at an appropriate timing and the compressed air is supplied from an air pipe (not shown) to the path 201-2, this compressed air is supplied to a bottom wall surface 203-21 of the boss hole 203-2 of the joint unit end 203 through the intermediate path 201-23, a path 206-11' of the joint unit piston 206-1', the intermediate path 202-12c of the joint unit 202-1, a path 206-21' of the joint unit piston 206-2', the intermediate path 202-22c of the joint unit 202-2, and a path 206-31' of the joint unit piston 206-3'. That is, the compressed air acts on the joint unit end 203 using the bottom wall surface 203-21 of the boss hole 203-2 as a pressure-receiving surface. The joint unit end 203 is pivoted about the pin 209-3 clockwise. When the joint unit end 203 is pivoted and its outer wall surface is brought into contact with the outer wall surface of the joint unit 202-2, the joint unit 202-2 is urged by the joint unit end 203 and is pivoted about a pin 209-2 clockwise. When the joint unit 202-2 is brought into contact with the joint unit 202-1 through the joint unit piston 206-2, the joint unit 202-1 is brought into contact with the joint unit top 201 through the joint unit piston 206-1. Therefore, the joint units 202-1 and 202-2, and the joint unit end 203 are returned to the home positions shown in FIG. 18.

In the multi-articulated finger 210 of this embodiment, a joint unit finger 204 is arcuatedly moved in cooperation with the joint unit end 203. By utilizing the arcuated movement of the joint unit finger 204, jobs such as gripping of a target object can be performed.

In the multi-articulated finger 210 of this embodiment, in the joint unit 202-1 (202-2), outer wall surfaces 202-16 (202-26) and 202-17 (202-27) are constituted by inclined surfaces whose lower portions are close to each other in an assembled state in FIG. 18. The pivot amounts of the joint unit end 203 and the joint units 202-2 and 202-1 can be set to be large. The displacement stroke of the joint unit finger 204 can be increased, and a desired job can be properly performed.

Figure 20:
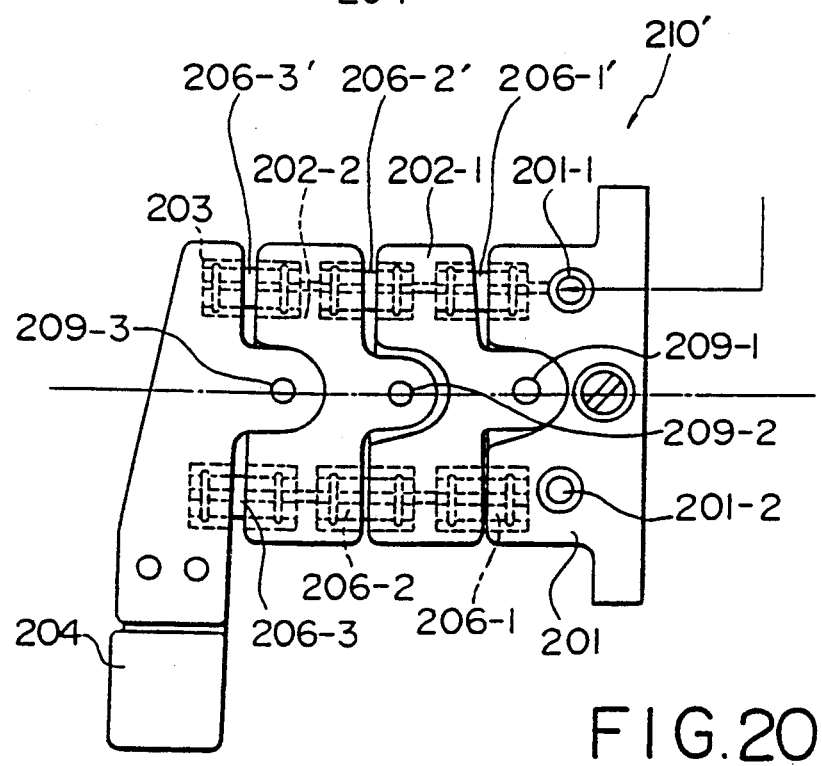
FIG. 20 is a front view showing a multi-articulated finger according to still another embodiment of the present invention.
Figure 21:
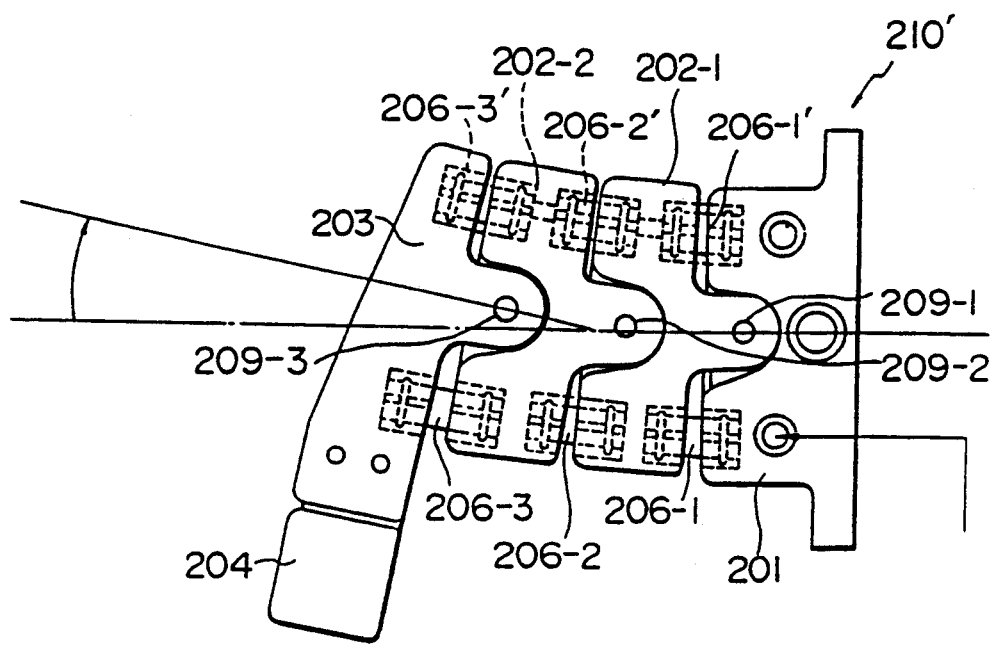
FIG. 21 is a front view showing an operating state of the multi-articulated finger shown in FIG. 20.

In the above embodiment, the joint unit finger 204 is arcuately moved clockwise from the initial state (i.e., the state shown in FIG. 18). However, as shown in FIG. 9, the joint unit finger 204 may be arcuately moved clockwise from the initial state (i.e., a state of FIG. 20), as shown in FIG. 21.

Figure 22:
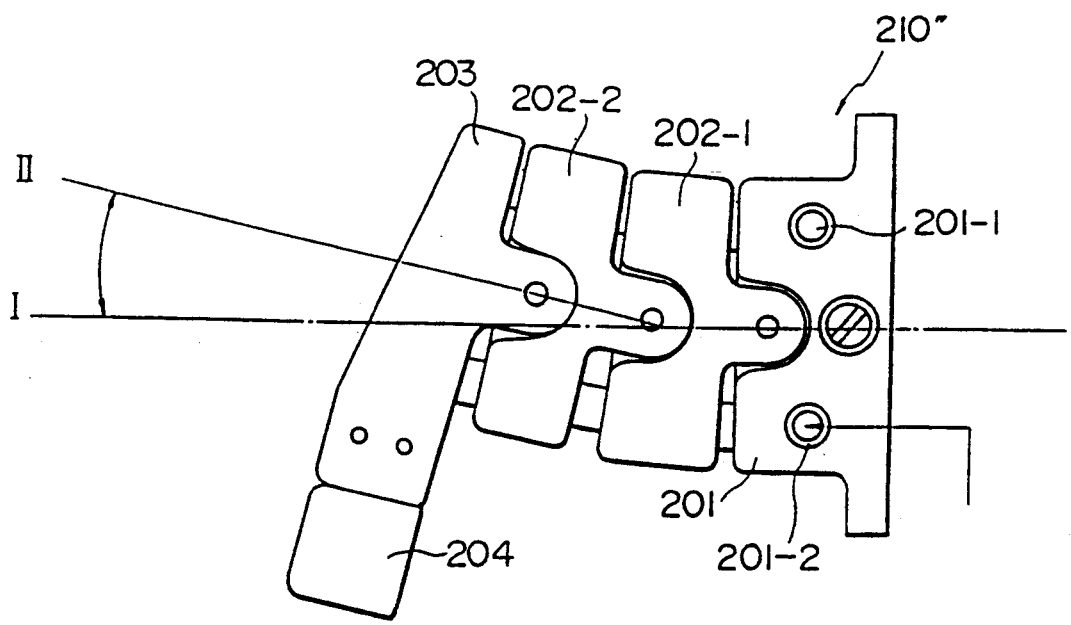
FIGS. 22 and 23 are front views showing an operating state of the multi-articulated finger shown in FIG. 20.
Figure 23:
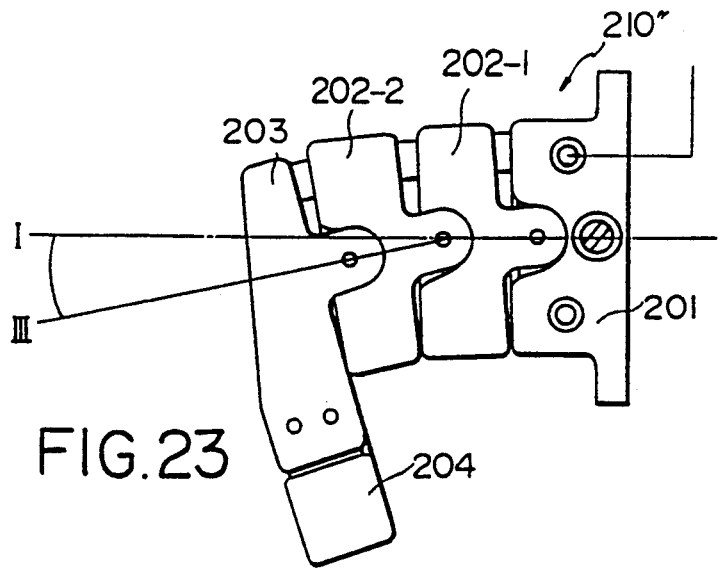

When joint unit pistons 206' having small lengths L' are used in all connecting portions, and the joint units 202-1 and 202-2 are combined upside down, the joint unit finger 203 can be arcuately moved to a clockwise position II or counterclockwise position III as shown in FIG. 22 or 23.

Figure 24:
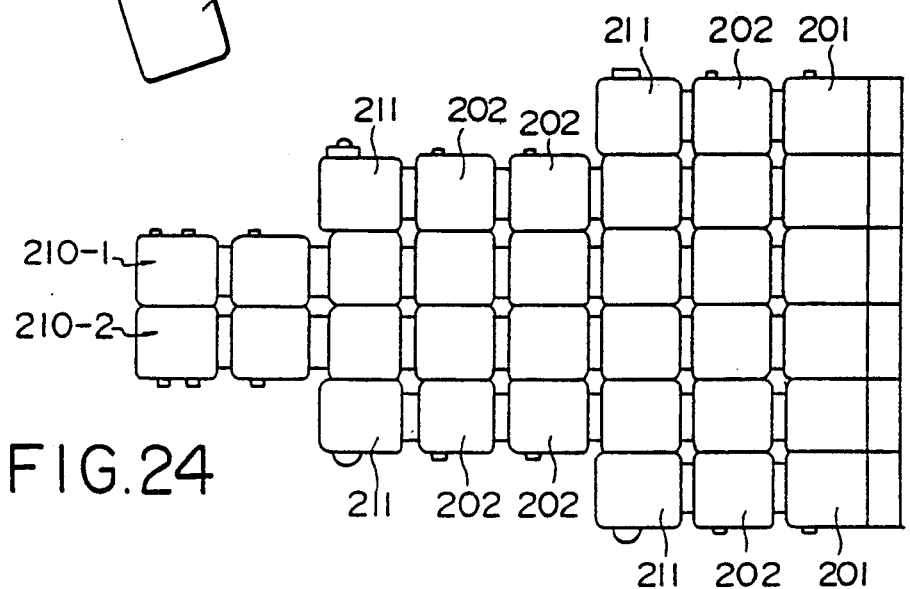
FIGS. 24 and 25 are a plan view and a front view, respectively, showing a state wherein two pairs of multi-articulated fingers serving as basic members are combined and reinforced.
Figure 25:
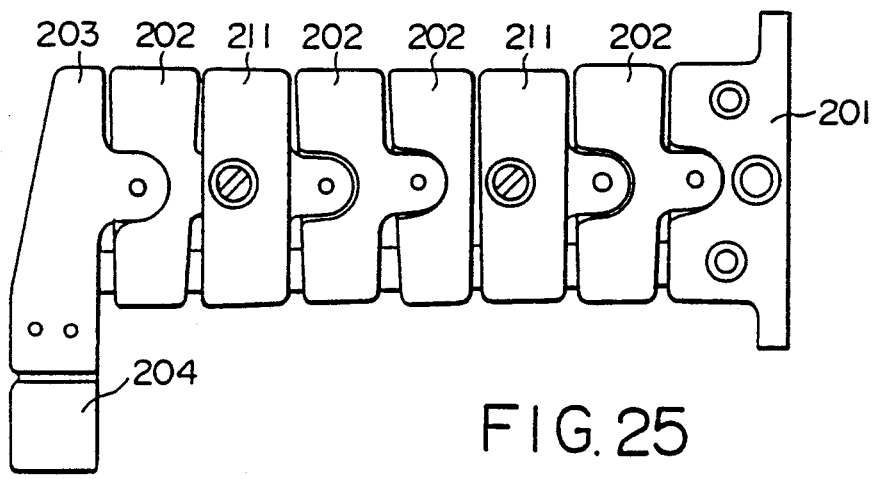

In each of the above embodiments, the two joint units are combined. However, three or more joint units may be combined to increase an arcuated displacement stroke of the joint unit finger 204, and the number of joints is increased to perform a finger movement. In this case, as shown in FIGS. 24 and 25, two pairs of multi-articulated fingers 210-1 and 210-2, are combined, and a large number of joint units 202 and side stops 211 are combined to reinforce the multi-articulated finger assembly.

Figure 26:
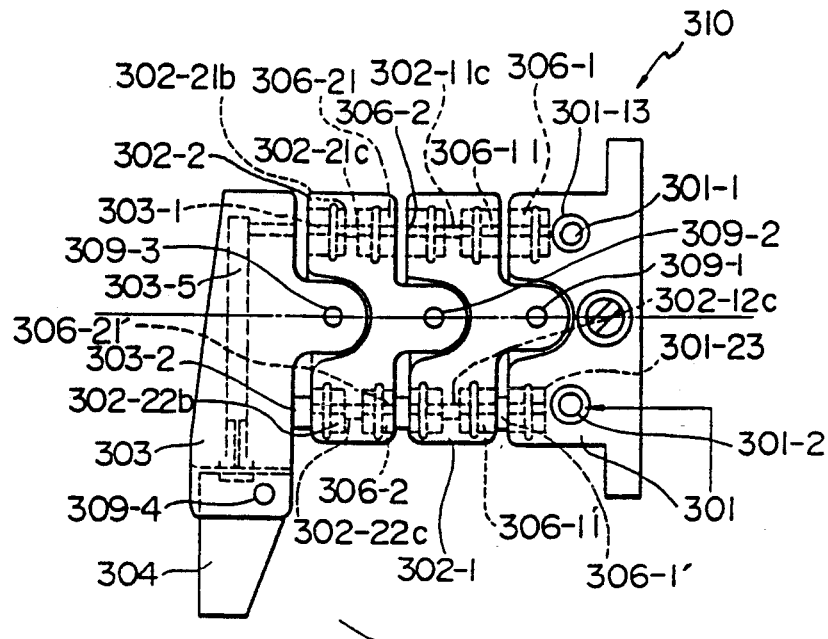
FIG. 26 is a front view showing a multi-articulated finger according to still another embodiment of the present invention.
Figures 27A, 27B:
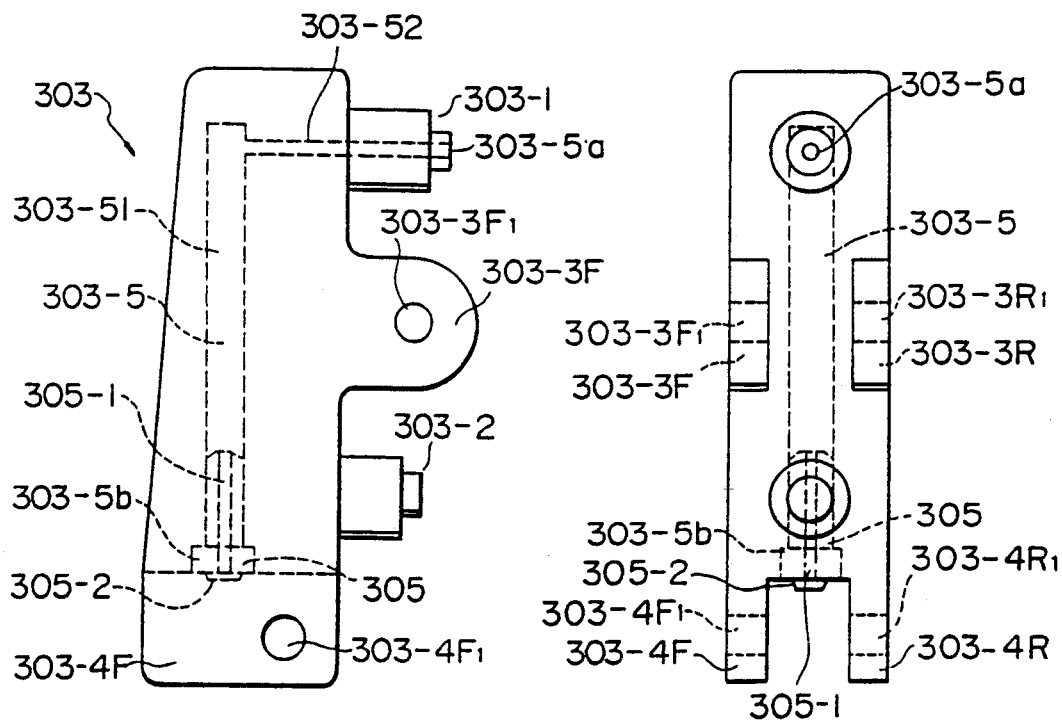
FIGS. 27A and 27B are a front view and a side view, respectively, showing a joint unit end used in the multi-articulated finger shown in FIG. 26.

FIG. 26 shows a multi-articulated finger according to still another embodiment of the present invention. Referring to FIG. 26, a structure except for a joint unit end 303 and a joint unit finger 304 is identical with that in FIG. 18. The same reference numerals as in FIG. 18 denote the same parts in FIG. 26, and a detailed description thereof will be omitted. As shown in FIGS. 27A and 27B, the joint unit end 303 has laterally extending bosses 303-1 and 303-2. Through holes 303-F1 and 303-3R1 are formed in the central portions of collar surface portions 303-3F and 303-3R, respectively. Rectangular collar surface portions 303-4F and 303-4R extending downward are respectively formed on the front and rear surfaces of the joint unit end 303. Through holes 303-4F1 and 303-4R1 are formed in the central portions of the collar surface portions 303-4F and 303-4R, respectively. The joint unit end 303 has a fluid leakage path 303-5 therein. A one-end opening 303-5a of the fluid leakage path 303-5 faces outward from the distal end face of the boss 303-1 through a lateral path 303-52 communicating with a longitudinal path 303-51. The other-end opening 303-5b of the fluid leakage path 303-5 faces outward from a portion between collar surface portions 303-4a and 303-4b. A stop valve 305 having a small-diameter through path 305-1 is fitted in the other-end opening 305-5b. A distal end face 305-2 of the stop valve 305 extends slightly from the bottom wall surface of the joint unit end 303.

As shown in FIGS. 28A and 28B, the joint unit finger 304 has a convex step 304-3 having a through hole 304-2 in the upper portion of a pawl 304-1. A rubber mat 308 is formed on the upper surface portion of the convex step 304-3. The upper surface portion of the rubber mat 308 slightly extends from the upper wall surface of the joint unit finger 304.

An operation of a multi-articulated finger 310 having the above structure will be described below.

Referring to FIG. 26, assume that compressed air is supplied to the path 301-2 of the joint unit top 301, and that the multi-articulated finger 310 is set in an operating state shown in FIG. 26. In this operating state, when supply of the compressed air to the path 301-2 is interrupted and compressed air is supplied to a path 301-1, this compressed air is supplied to the other-end opening 302-21b of a joint unit 302-2 through an intermediate path 301-13, a path 306-11 of a joint unit piston 306-1, an intermediate path 302-11c of a joint unit 302-1, a path 306-21 of a joint unit piston 306-2, and an intermediate path 302-21c of the joint unit 302-2. The compressed air supplied to the other-end opening 302-21b acts on the joint unit end 303 using the distal end face of the boss 303-1 (including an O-ring 307) as a pressure-receiving surface since the boss 303-1 of the joint unit end 303 is fitted in the other-end opening 302-21c. The joint unit end 303 is pivoted about a pin 309-2 counterclockwise. When the joint unit end 303 is pivoted and its outer wall surface is brought into contact with the outer wall surface of the joint unit 302-2, the joint unit 302-2 is urged by the outer wall surface of the joint unit end 303 and is pivoted counterclockwise. At this time, a gap between the opposite outer wall surfaces of the joint units 302-1 and 302-2 which sandwich the joint unit piston 306-2 is increased. The compressed air supplied to the other-end opening 302-11b in the joint unit piston 306-2 acts on a flange surface of the joint unit piston 306-2. The joint unit 302-2 receives a counterclockwise rotational force and the pressure acting thereon, so that the joint unit 302-2 is further pivoted counterclockwise by a sum of abutment with the joint unit end 303 and the pressure acting thereon. When the outer wall surface of the joint unit 302-2 is brought into contact with the outer wall surface of the joint unit 302-1, the joint unit 302-1 is pivoted counterclockwise by a sum of abutment with the joint unit 302-2 and the pressure acting thereon. The outer wall surface of the joint unit 302-1 is brought into contact with the outer wall surface of a joint unit top 301 and is stopped or regulated.

The compressed air supplied to the other-end opening 302-21b of the joint unit 302-2 is supplied to the longitudinal path 303-51 through the lateral path 303-52 from the one-end opening 303-5a of the fluid leakage path 303-5 facing outward from the distal end face of the boss 303-1 of the joint unit end 303, as is apparent from FIG. 29. The compressed air supplied to the longitudinal path 305-51 passes through the through path 305-1 of the stop valve 305 and slightly leaks from a portion between the distal end face 305-2 of the stop valve 305 and the rubber mat 308 using an outlet of the through path 305-1 as an outlet of a fluid leakage path 305-5. During counterclockwise pivotal movement of the joint unit end 303, when the joint unit finger 304 cooperating with the joint unit end 303 is brought into contact with a target object, the joint unit finger 304 is pivoted about a pin 309-4 clockwise and is retracted. The rubber mat 308 is urged against the distal end face 305-2 of the stop valve 305 to perfectly close the outlet of the fluid leakage path 303-5. As a result, the pressure of the compressed air supplied from the path 301-1 of the joint unit stop 301 is increased.

When supply of the compressed air to the path 301-1 of the joint unit top 301 is interrupted at an appropriate timing and compressed air is supplied to the path 301-2, this compressed air is supplied to the other-end opening 302-22b of the joint unit 302-2 through an intermediate path 301-23, a path 306-11' of a joint unit piston 306-1', an intermediate path 302-12c of the joint unit 302-1, a path 306-21' of a joint unit piston 306-2', and an intermediate path 302-22c of the joint unit 302-2. The compressed air supplied to the other-end opening 302-22b acts on the joint unit end 303 using the distal end face of the boss 303-2 (including the O-ring 7) as a pressure-receiving surface since the boss 303-2 of the joint unit end 303 is fitted in the other-end opening 302-22b. The joint unit end 303 is pivoted about a pin 309-3 clockwise. When the joint unit end 303 is pivoted and its outer wall surface is brought into contact with the outer wall surface of the joint unit 302-2, the joint unit 302-2 is urged by the outer wall surface of the joint unit end 303 and is pivoted about a pin 309-2 clockwise. When the joint unit 302-2 is brought into contact with the joint unit 302-1 through the joint unit piston 306-2, the joint unit 302-1 is pivoted about a pin 309-1 clockwise. When the joint unit 302-1 is brought into contact with the joint unit top 301 through the joint unit piston 306-1, the joint units 302-1 and 302-2 and the joint unit end 303 are returned to the home positions shown in FIG. 26.

In the multi-articulated finger 310 of this embodiment, the joint unit finger 304 is arcuatedly moved in cooperation with the joint unit end 303. By utilizing arcuated movement of the joint unit finger 304, joints such as gripping of a target object can be performed.

In the multi-articulated finger 310 of this embodiment, when, e.g., a target object is gripped with the joint unit finger 304, the joint unit finger 304 is retracted to completely close the outlet of the fluid leakage path 303-5. When an increase in pressure of the compressed air is detected, gripping of the target object with the joint unit finger 304 can be detected by the CPU 21-1 upon reception of a detection signal 90 in FIG. 9.

Figure 30:
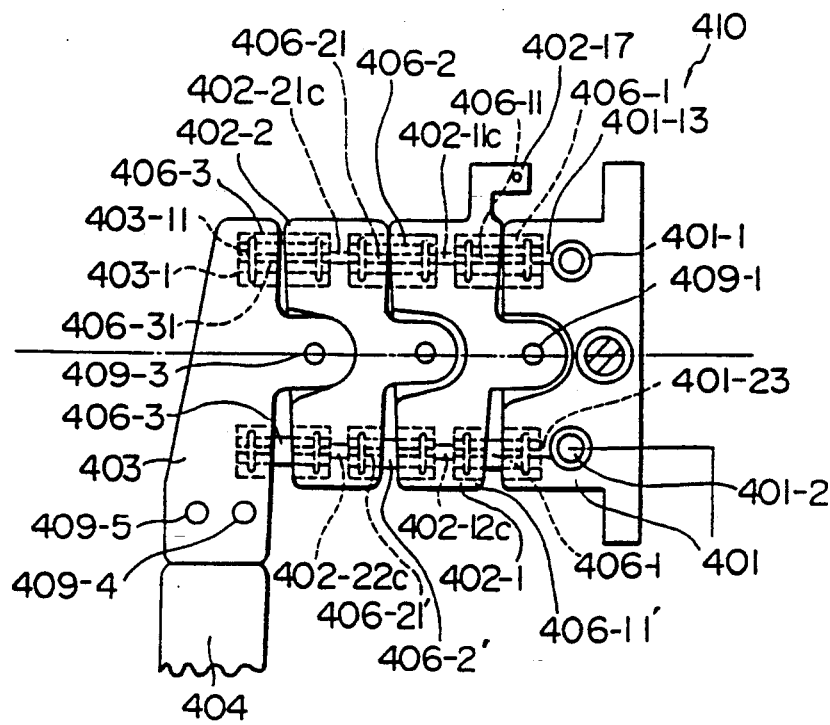
FIG. 30 is a plan view of a multi-articulated finger according to still another embodiment of the present invention.

FIG. 30 shows a multi-articulated finger according to still another embodiment of the present invention. The embodiment in FIG. 30 is substantially the same as that in FIG. 18 except that a hook-like displacement detection piece 402-17 having a through hole 402-17a therein is formed in a joint unit 402-1 so as to extend from its upper wall surface 402-16.

Figure 31:
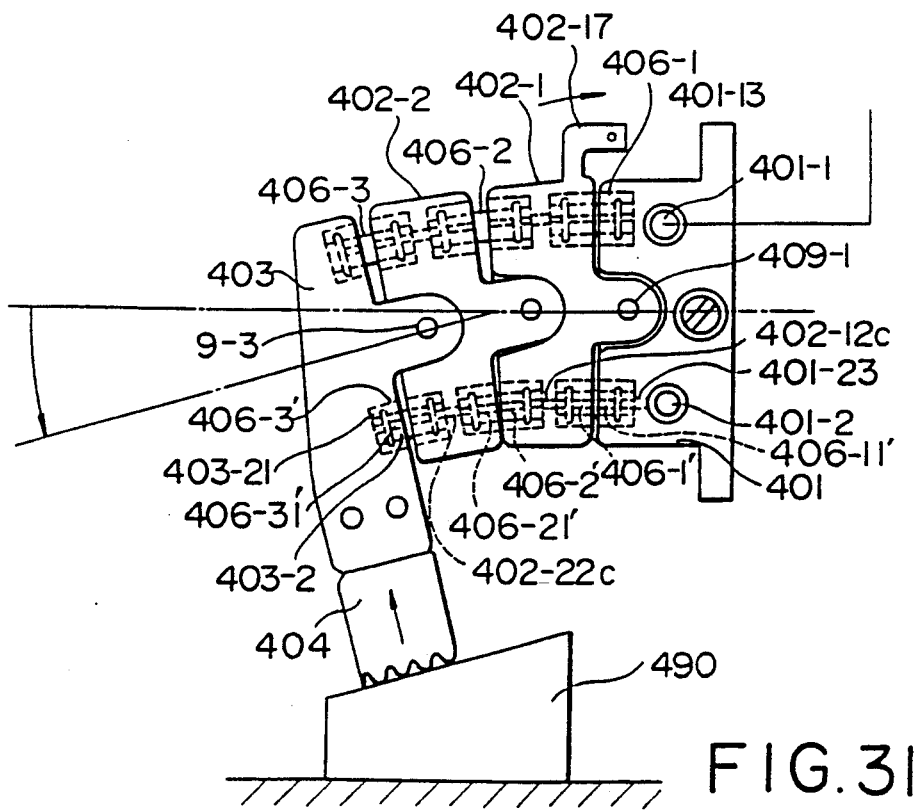
FIG. 31 is a front view showing an operating state wherein a target object is held by joint unit fingers as multi-articulated fingers.

In a multi-articulated finger 410 of this embodiment, when a target object is gripped with a joint unit finger 404, a state of the target object gripped by the joint unit finger 404 can be detected on the basis of a displacement position of the displacement detection piece 402-17 formed in the joint unit 402-1. More specifically, as shown in FIG. 31, when the joint unit finger 404 grips a target object 490, a reaction force from the target object 490 acts on a joint unit piston 406-3 with respect to a pin 409-2, and this force is then applied to a joint unit piston 406-1 with respect to a pin 409-1. For this reason, the joint unit 402-1 is retracted and pivoted about the pin 409-1 clockwise, so that a gap between the outer wall surfaces of the joint unit 402-1 and a joint unit top 401 which sandwich the joint unit piston 406-1 is decreased. The outer wall surface of the joint unit 402-1 is brought into contact with the outer wall surface of the joint unit top 401 and is stopped. For example, if a limit switch, a photoelectric sensor, a magnetic sensor, or a pressure sensor is used, a displacement of the joint unit 402-1 by the reaction force of the target object 490 can be detected by a displacement position of the displacement detection piece 402-17, thereby detecting gripping of the target object 490. More specifically, retraction of the joint unit 402-1 by the reaction force from the target object 490 is detected by the displacement position of the displacement detection piece 402-17, and gripping of the object 490 is detected by the CPU 21-1 upon reception of the detection signal 90 (FIG. 9) through the I/O port 21-4.

The displacement detection piece 402-17 may be arranged in a joint unit 402-2 or a joint unit end 403. When a gripping force of the joint unit finger 403 which grips the target object 490 is large, a reaction force from the target object 490 is also large. When the gripping force acting on the target object 490 is set to be large, the joint unit 402-2 is pushed by the joint unit 402-1, and the joint unit end 403 is pushed by the joint unit 402-1 pushed by the joint unit 402-2 in accordance with the magnitude of the gripping force. Therefore, when retraction of a joint unit at a predetermined position in the sequence is detected to detect that a desired gripping force acted on the target object 490.

The joint unit end may serve as the Nth joint, a joint unit for pivotally supporting the Nth joint may serve as the (N−1)th joint, a joint unit for pivotally supporting the (N−1)th joint may serve as the (N−2)th joint, and a displacement detection piece may be arranged in a predetermined on of the first to Nth joints.

The above embodiment exemplifies gripping of the target object 490. However, the joint unit finger 404 may urge the target object 490.

In the above embodiment, the joint unit finger (pawl) 404 is attached as a separate member to the joint unit end 403. However, a distal end of the joint unit end 403 is formed into a finger-like shape, this may be replaced with the joint unit finger 404.

Figure 32:
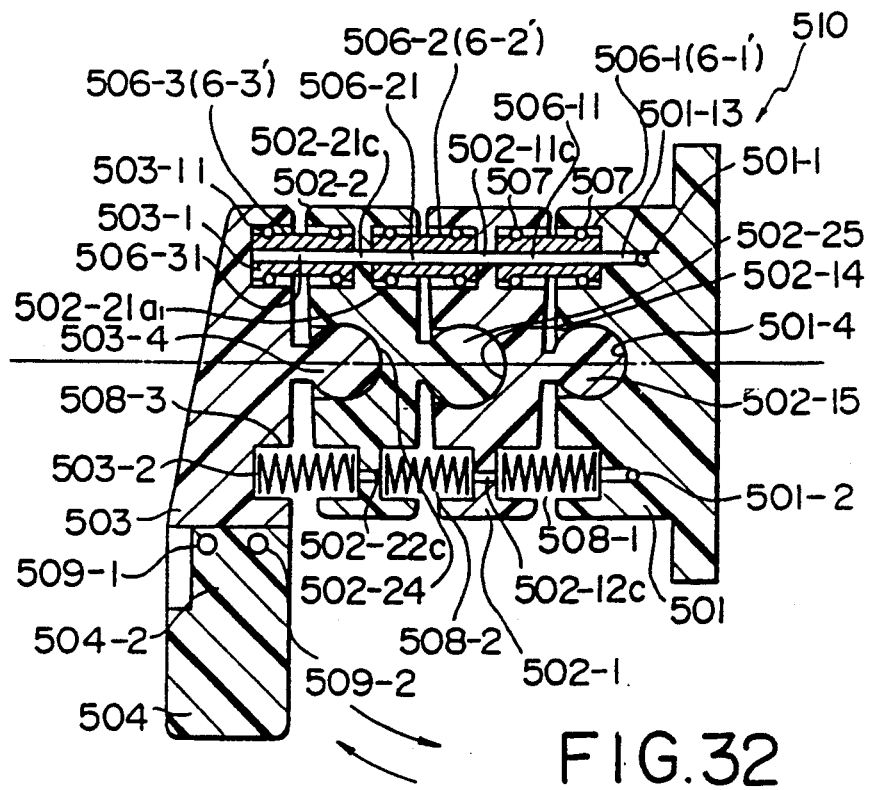
FIG. 32 is a front view showing a multi-articulated finger according to still another embodiment of the present invention.
Figure 33:
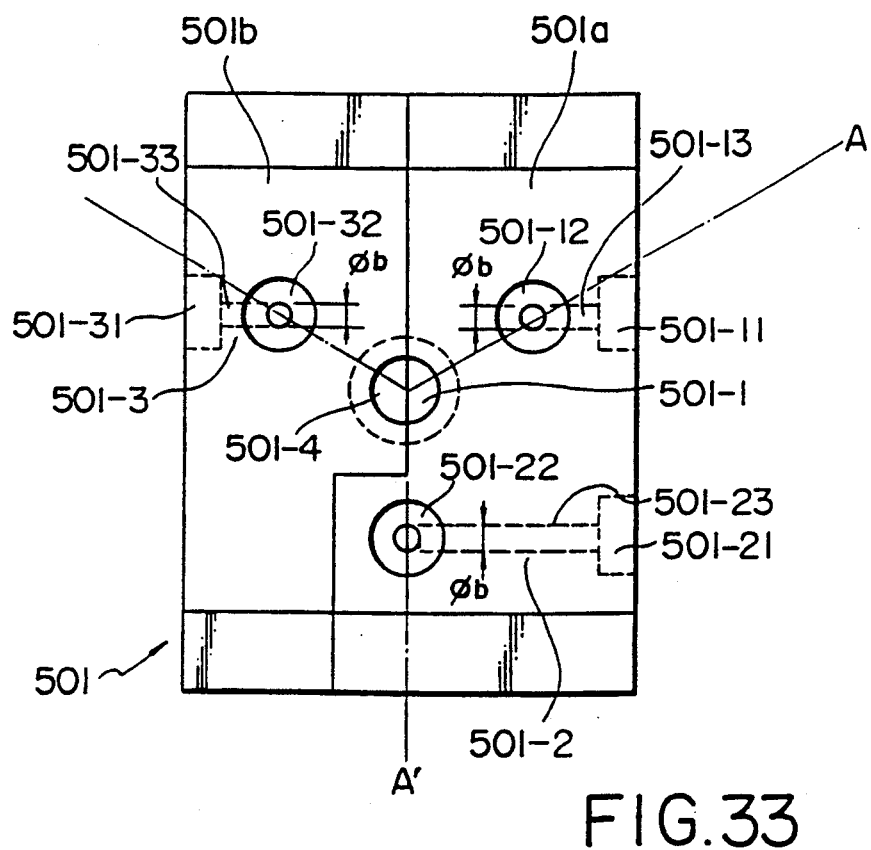
FIG. 33 is a side view showing a joint unit top used in the multi-articulated finger shown in FIG. 32.

FIG. 32 shows a multi-articulated finger according to still another embodiment of the present invention. As shown in FIG. 33, a joint unit top 501 has a first path 501-1, a second path 501-2, and a third path 501-3 as fluid paths. One-end openings 501-11, 501-21, and 501-31 and the other-end openings 501-12, 501-22, and 501-32 of the first, second, and third paths 501-1, 501-2, and 501-3 are formed to have a large diameter at equal angular intervals (i.e., 120° apart from each other). The joint unit top 501 is divided into unit tops 501a and 501b. An inner spherical universal bearing 501-4 is formed at the central portion where the unit tops 501a and 501b match each other. In this embodiment, the second path 501-2 is not utilized as a fluid path. A joint unit top 502 in FIG. 32 is illustrated as a section along A−A' in FIG. 33.

Figure 34:
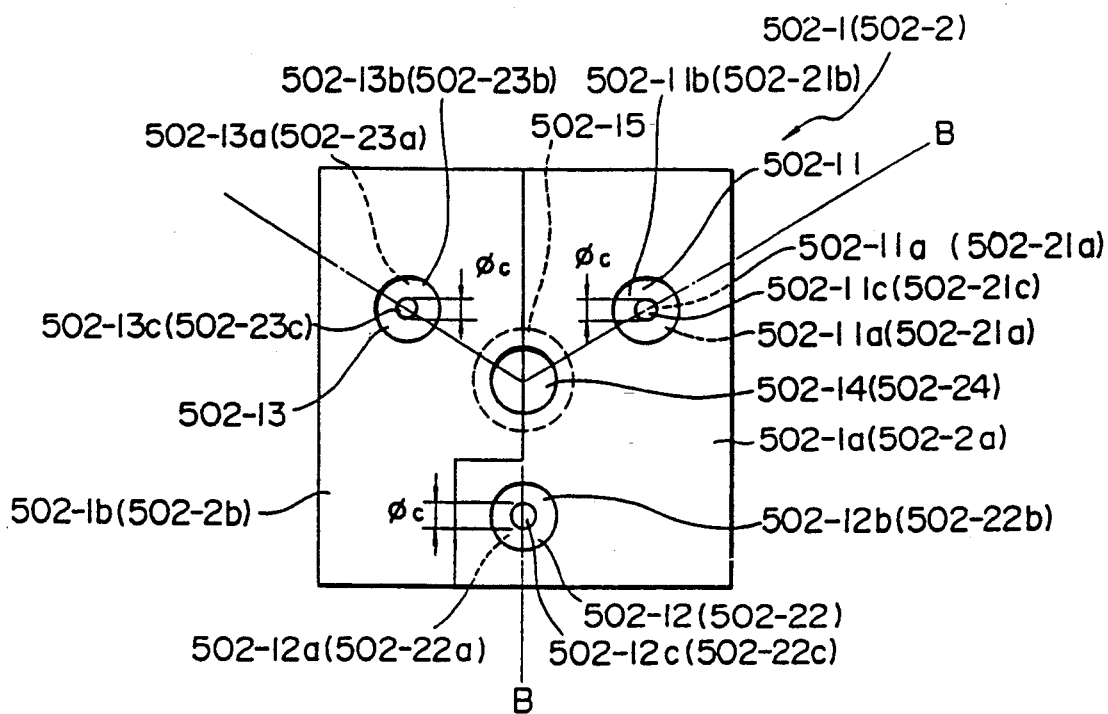
FIG. 34 is a side view of the joint unit used in the multi-articulated finger shown in FIG. 32.

As shown in FIG. 34, a joint unit 502-1 has a first path 502-11, a second path 502-12, and a third path 502-13. The axes of the paths 502-11, 502-12, and 502-13 are angularly spaced apart from each other by 120°. In the joint unit 502-1, one-end openings 502-11a, 502-12a, and 502-13a and the other-end openings 502-11b, 502-12b, and 502-13b of the first, second, and third paths 502-11, 502-12, and 502-13 have a large diameter. In the first path 502-11, the one-end opening 502-11a and the other-end opening 502-11b communicate with each other through a small-diameter intermediate path 502-11c. In the second path 502-12, the one-end opening 502-12a and the other-end opening 502-12b communicate with each other through a small-diameter intermediate path 502-12c. In the third path 502-13, the one-end opening 502-13a and the other-end opening 502-13b communicate with each other through a small-diameter intermediate path 502-13c. The joint unit 502-1 is divided into units 502-1a and 502-1b, and an inner spherical universal bearing 502-14 is formed in the front portion of the central portion where the units 502-1a and 502-1b match each other. A spherical universal bearing 502-15 is formed at the rear portion. A joint unit 502-2 and the joint unit 502-1 are identical parts. In this embodiment, the second path 502-12 (502-22) is not used as a fluid path. In FIG. 32, the joint units 502-1 and 502-2 are illustrated as a section along the line B−B'.

Figure 35:
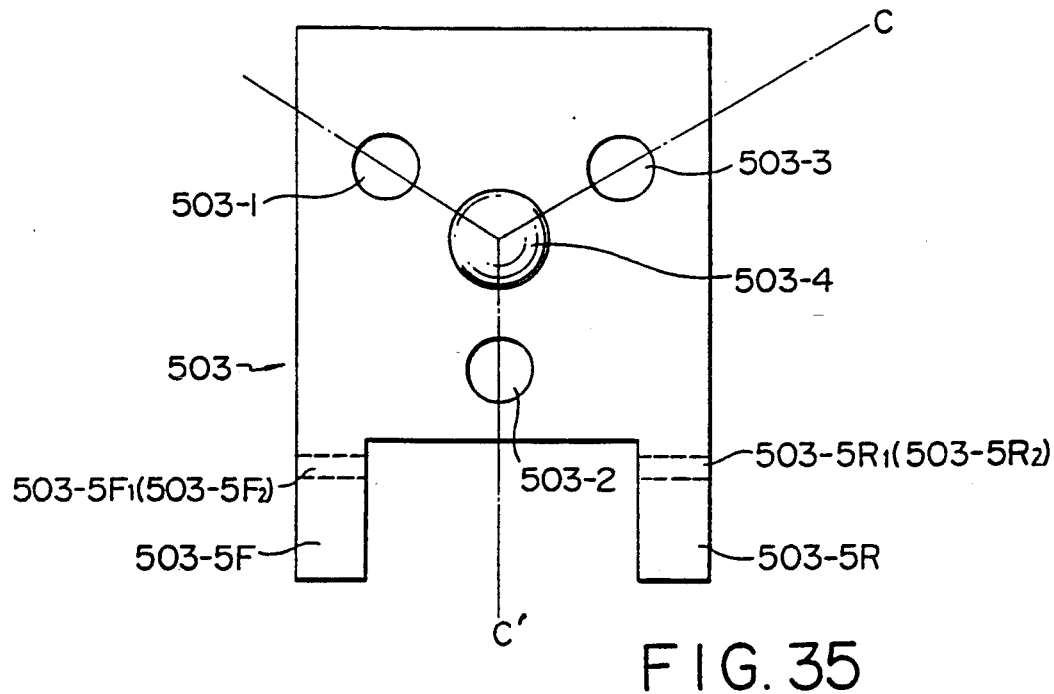
FIG. 35 is a side view of a joint unit end used in the multi-articulated finger shown in FIG. 32.

As shown in FIG. 35, a joint unit end 503 has lateral boss holes 503-1, 503-2, and 503-3. These boss holes 503-1, 503-2, and 503-3 are spaced apart from each other by 120°. A universal bearing 503-4 is formed at the central portion of the joint unit end 503. Rectangular collar surface portions 503-4F and 503-4R extending downward are formed in the joint unit end 503. Rectangular through holes 503-5F1 and 503-5F2 and rectangular through holes 503-5R1 and 503-5R2 are formed, in rectangular collar surface portions 503-5F and 503-5R, respectively. In FIG. 32, the rectangular unit end 503 is illustrated as a section along the line C–C' in FIG. 35.

An assembly state of this multi-articulated finger 510 will be described below.

The joint unit top 501 is fixed on a robot body (not shown), and air pipes (not shown) are connected to the one-end opening 501-11 of the path 501-1 and the one-end opening 501-31 of the path 501-3, respectively. A universal bearing ball 502-15 is located within a universal bearing 501-14 to connect the unit tops 501a and 501b, and then the joint unit 502-1 is connected to the joint unit top 501. Pivotal movement of the joint unit 502-1 is regulated by the joint unit top 501 in a manner to be described later. The joint unit 502-1 is pivotally supported by the joint unit top 501 in all directions. In this case, joint unit pistons 506-1 and 506-1' mounted with O-rings 507 are inserted between the other-end openings 501-12 and 501-32 of the joint unit top 501 and the one-end openings 502-11a and 502-13a of the joint unit 502-1. A compression coil spring 508-1 is inserted between the other-end opening 501-22 of the joint unit top 501 and the one-end opening 502-12a of the joint unit 502-1.

A universal bearing ball 502-25 is located within the universal bearing 502-14 to connect the units. 502-1a and 502-1b, so that the joint unit 502-2 is connected to the joint unit 502-1. Pivotal movement of the joint unit 502-2 is regulated by the joint unit 502-1 in a manner to be described later, so that the joint unit 502-2 is pivotally supported by the joint unit 502-1 in all directions. In this case, joint unit pistons 506-2 and 506-2' mounted with O-rings 507 are inserted between the other-end openings 502-11b and 502-13b of the joint unit 502-1 and the one-end openings 502-21a and 502-23a of the joint unit 502-2. A compression coil spring 508-2 is inserted between the other-end opening 502-12b of the joint unit 502-1 and the one-end opening 502-22a of the joint unit 502-2.

The universal bearing ball 503-4 is located within a universal bearing 502-24 to connect units 502-2a and 502-2b, so that the joint unit end 502 is connected to the joint unit 502-2. Pivotal movement of the joint unit end 503 is regulated by the joint unit 502-2, so that the joint unit end 503 is pivotally supported by the joint unit 502-2 in all directions. In this case, joint unit pistons 506-3 and 506-3', mounted with O-rings 507 are inserted between the other-end openings 502-21b and 502-23b of the joint unit 502-2 and the boss holes 503-1 of the joint unit end 503. A compression coil spring 508-3 is inserted between the other-end opening 502-22b of the joint unit 502-2 and the boss hole 503-2 of the joint unit end 503.

The joint unit pistons 506-1 to 506-3 and 506-1' to 506-3' have different reference numerals for illustrative convenience but are identical parts. Similarly, the compression coil springs 508-1 to 508-3 are also identical parts. In a state shown in FIG. 33, a slight gap is formed between the opposite outer wall surfaces between the joint units 502-1 and 502-2, and the compression coil spring 508-2 applies a biasing force to the joint unit 502-2. A slight gap is formed between the opposite outer wall surfaces of the joint unit 502-2 and the joint unit end 503, and the compression coil spring 508-3 applies a biasing force to the joint unit end 503. The intermediate path 502-11c (502-13c) of the joint unit 502-1 and an intermediate path 502-21c (502-23c) of the joint unit 502-2 communicate with each other through a path 506-21 (506-21') of the joint unit piston 506-2 (506-2').

A convex step 504-2 of a joint unit finger 504 is inserted between the collar surface portions 503-5F and 503-5R of the joint unit end 503, and pins 509-1 and 509-2 are inserted in the mating through holes.

An operation of the multi-articulated finger 510 having the above structure will be described below.

In a state shown in FIG. 32, when compressed air is supplied to the path 501-1 of the joint unit top 501, the compressed air is supplied to a bottom wall surface 503-11 of the boss hole 503-1 of the joint unit end 503 through an intermediate path 501-13, a path 506-11 of the joint unit piston 506-1, the intermediate path 502-11c of the joint unit 502-1, the path 506-21 of the joint unit piston 506-2, the intermediate path 502-21c of the joint unit 502-2, and a path 506-31 of the joint unit piston 506-3. That is, the compressed air acts on the joint unit end 503 using the bottom wall surface 503-11 of the boss hole 503-1 as a pressure-receiving surface The joint unit end 503 is pivoted counterclockwise while being inclined backward on the drawing surface against the biasing force of the compression coil spring 508-3. When the joint unit end 503 is further pivoted and its outer wall surface is brought into contact with the outer wall surface of the joint unit 502-2, the joint unit 502-2 is urged by the outer wall surface of the joint unit end 503, so the joint unit 502-2 is pivoted counterclockwise. At this time, a gap between the opposite outer wall surfaces between the joint units 502-1 and 502-2 which sandwich the joint unit piston 506-2 is increased. The compressed air supplied to the other-end opening 502-11b acts on a flange surface of the joint unit piston 506-2, and this force is transmitted to a bottom wall surface 502-21a1 (FIG. 34) of the one-end opening 502-21a. That is, the joint unit 502-2 receives the counterclockwise rotational force, i.e., the pressure acting thereon on the bottom wall surface 502-21a1 as the pressure-receiving surface. The joint unit 502-2 is pivoted counterclockwise while being inclined backward on the drawing surface against the biasing force of the compression coil spring 508-2 by a sum of abutment with the joint unit end 503 and the pressure acting thereon. When the outer wall surface of the joint unit 502-2 is brought into contact with the outer wall surface of the joint unit 502-1, the joint unit 502-1 is pivoted counterclockwise while being inclined backward on the drawing surface against the biasing force of the compression coil spring 508-1 by a sum of abutment with the joint unit 502-2 and the pressure acting thereon. The joint unit 502-1 is further pivoted, and its outer wall surface is brought into contact with the outer wall surface of the joint unit top 501 and is stopped.

Figure 36:
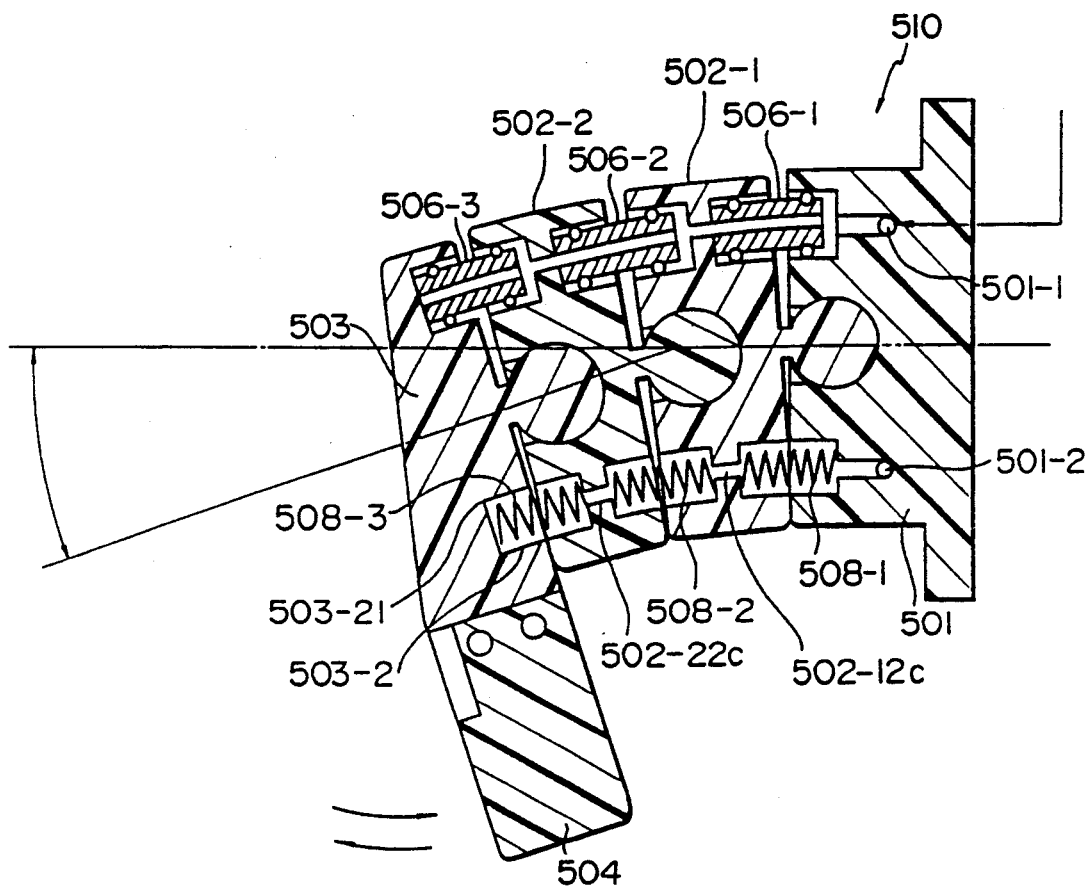
FIG. 36 is a front view showing an operating state of the multi-articulated finger shown in FIG. 32.

An operation of this multi-articulated finger 510 at this time is shown in FIG. 36.

When supply of the compressed air from the path 501-1 of the joint unit top 501 is stopped at an appropriate timing, the joint units 502-1 and 502-2 and the joint unit end 503 are turned clockwise and automatically returned to the home positions shown in FIG. 32 by the return forces of the compression coil springs 508-1 to 508-3.

In the state shown in FIG. 32, when compressed air is supplied to the path 501-3 of the joint unit top 501, the joint unit end 503 and the joint units 502-1 and 502-2 are pivoted counterclockwise while being inclined forward on the drawing surface, and the operation in a direction opposite to that described above is performed.

In the multi-articulated finger 510 of this embodiment, a communication path to which compressed air is supplied is selectively set, so that the joint unit finger 504 can be arcuatedly moved selectively in two opposite directions. By utilizing the movement of this joint unit finger 504, jobs such as selective gripping of two target objects located in two opposite directions can be performed.

In the above embodiment, the compression coil springs 508-1 to 508-3 are used as return means. However, joint unit pistons having a length L smaller than the joint unit piston 506 may be used in place of the compression coil springs 508-1 to 508-3. In this case, an air pipe may be connected to the second path 501-2 of the joint unit top 501, and compressed air is supplied to the path 501-2 while supply of the compressed air to the first or third path 501-1 or 501-3 is interrupted.

Figure 37:
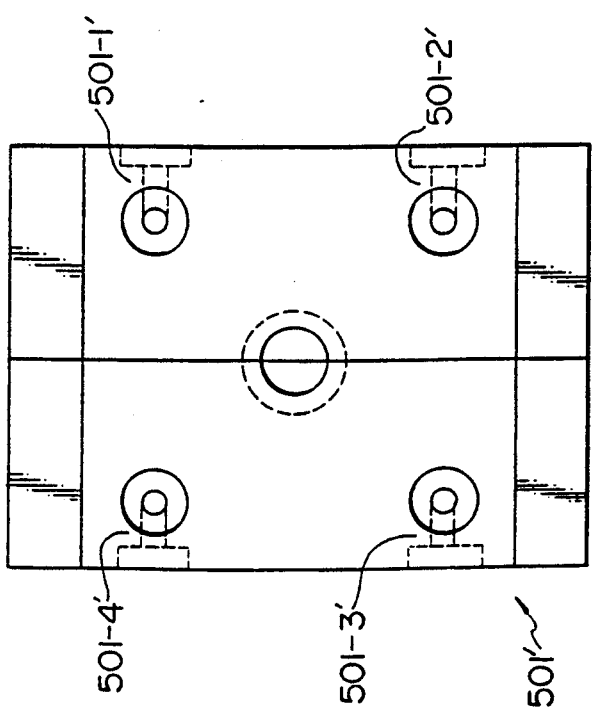
FIG. 37 is a side view of another joint unit top of the multi-articulated finger shown in FIG. 32.

In the above embodiment, the paths 501-1 to 1-3 are formed in the joint unit top 501, and the joint unit finger 504 is divided into two parts to obtain an arcuated movement. However, as shown in FIG. 37, paths 501-1' to 501-4' may be formed in a joint unit top 501', and the joint unit finger 504 may be moved in three different directions. In this case, paths and boss holes are formed in the joint units and the joint unit end in correspondence with the paths 501-1' to 501-4' of the joint unit top 501', and a compression coil spring or a joint unit piston having the small length L is arranged in one of the four series of holes, as a matter of course. When the joint unit pistons having the small length L are inserted in four series of paths, and the compressed air is selectively supplied to one of the four series of paths, thereby freely adjusting a movement direction and a displacement of the joint unit finger 504. In this manner, the joint unit finger can be freely moved in all directions.

In the above embodiment, two joint units are combined. However, three or more joint units may be combined to increase an arcuated displacement stroke of the joint unit finger 504. At the same time, the number of joints can be increased to achieve a finer movement.

Figure 38:
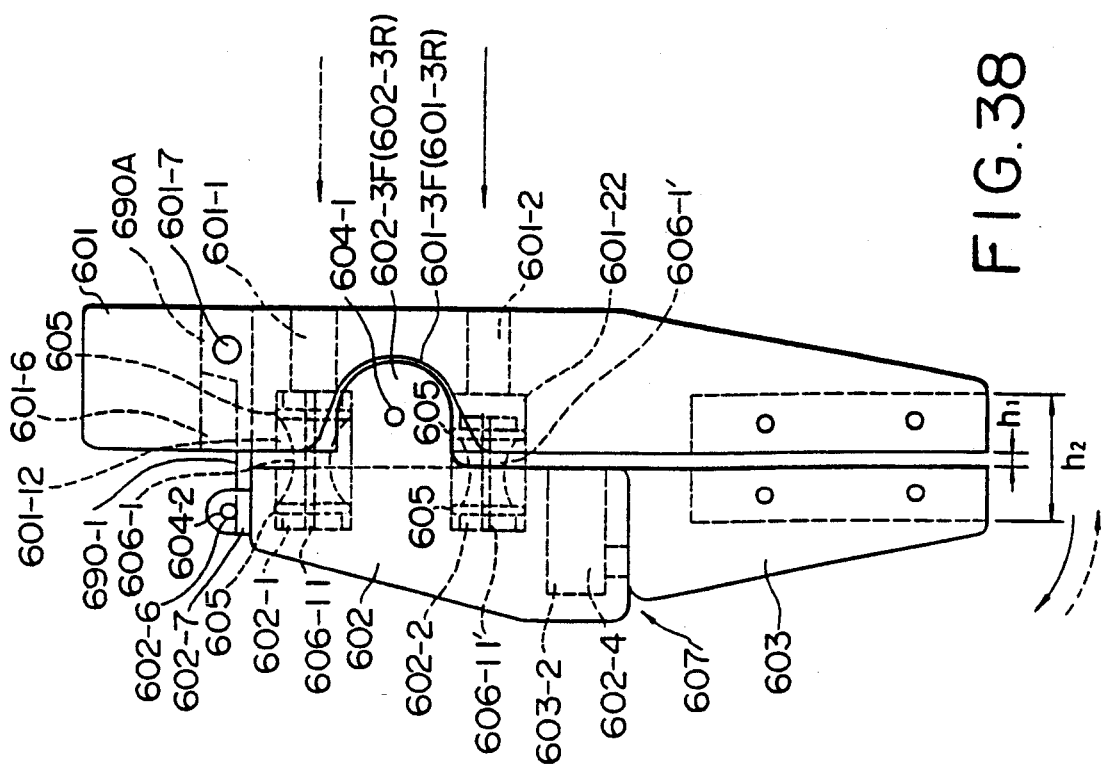
FIG. 38 is a front view showing a clamp mechanism including a joint mechanism according to the present invention.

FIG. 38 shows a clamp mechanism including a joint mechanism. Referring to FIG. 38, reference numeral 601 denotes a base block; 602, an end block; 603, a finger holder; and 690-1, a sensor lot. The base block 601, the end block 602, the finger holder 603, and the sensor lot 690-1 are constituted by resin members, respectively.

Figures 39A, 39B, 39C:
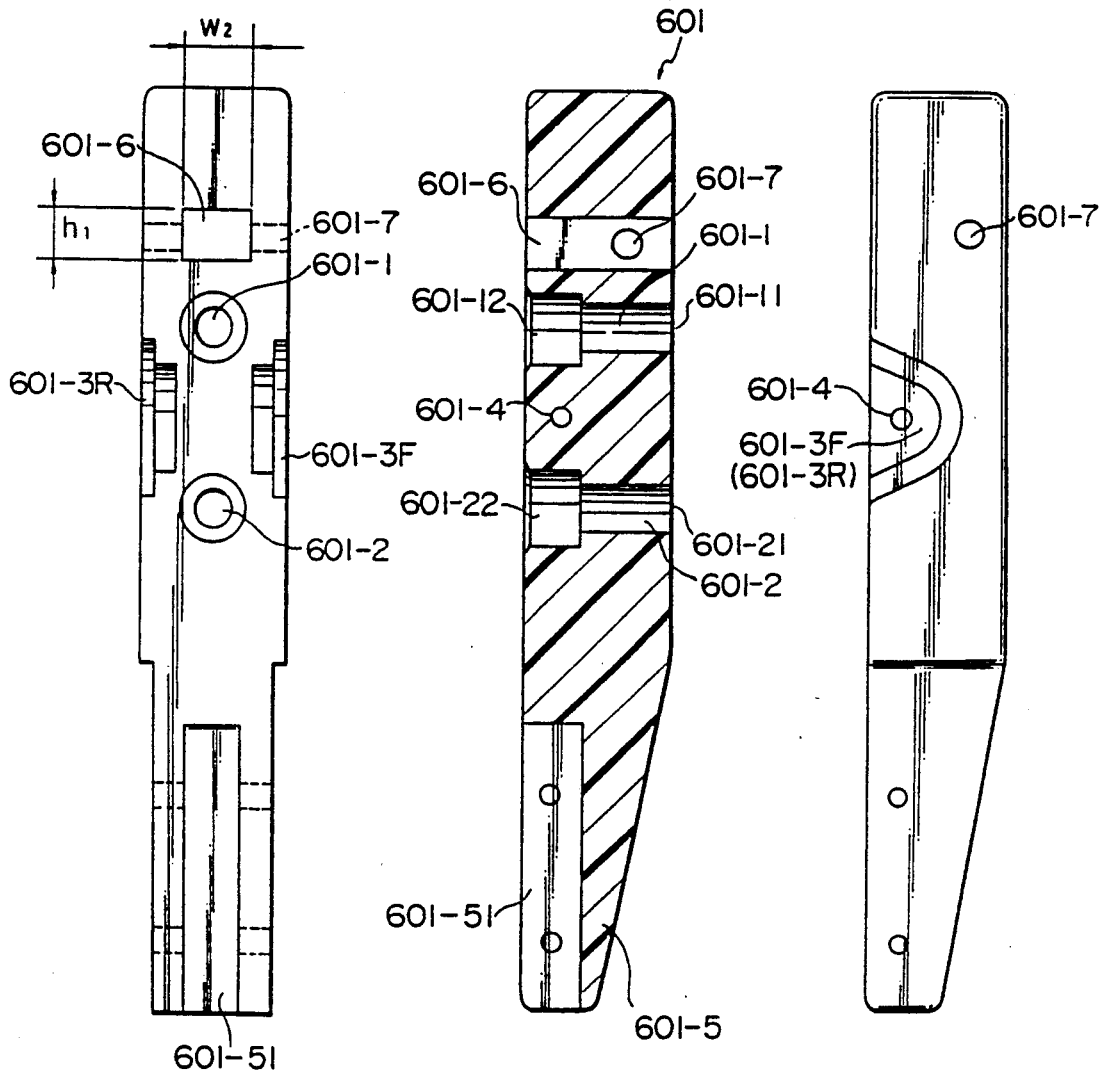
FIGS. 39A–39C are views showing a base block used in this clamp mechanism.

As shown in FIGS. 39A, 39B, and 39C, the base block 601 has a first path 601-1 and a second path 601-2 as fluid paths. The paths 601-1 and 601-2 have one-end small-diameter openings 601-11 and 601-21, respectively, and the paths 601-1 and 601-2 have the other-end large-diameter openings 601-12 and 601-22. Semicircular recessed steps 601-3F and 601-3R are respectively formed on the front and rear surfaces of the base block 60. A through hole 601-4 is formed in the central portions of the recessed steps 601-3F and 601-3R. The base block 601 has a distal end portion having one side surface inclined downward. A groove 601-51 is formed in the lateral flat surface of a distal end portion 601-5. The base block 601 has a path 601-6 laterally extending in the upper portion thereof. A through hole 601-7 is formed in a direction perpendicular to the lateral path 601-6.

Figure 40A:
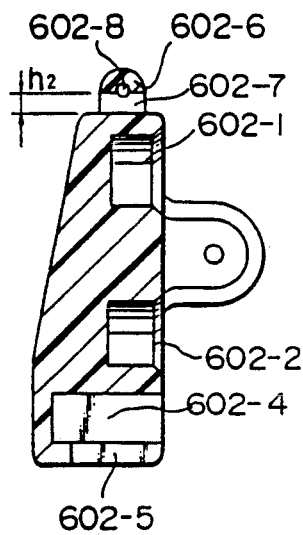
FIGS. 40A–40D are views showing an end block.
Figure 40B:
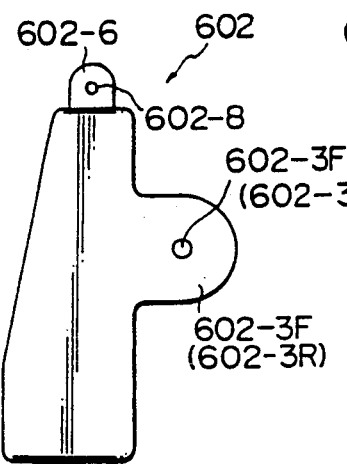
Figure 40C:
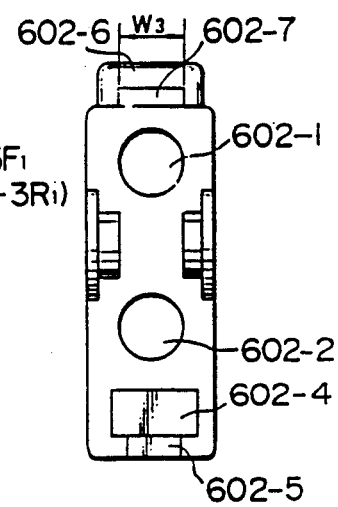

As shown in FIGS. 40A, 40B, and 40C, the end block 602 has lateral boss holes 602-1 and 602-2. The end block 602 also has semicircular collar surface portions 602-3F and 602-3R laterally extending on the front and rear surfaces thereof. Through holes $602\text{-}3F_1$ and $602\text{-}3R_1$ are formed in the collar surface portions 602-3F and 602-3R, respectively. A lateral hole 602-4 is formed in a lower lateral portion of the end block 602, and a longitudinal hole 602-5 is formed in the lateral hole 602-2. The end block 602 has a projection 602-6 on its upper surface portion. A laterally extending path 602-7 is formed in the projection 602-6. A through hole 602-8 is formed in the path 602-7 so that part of the through hole 602-8 partially crosses the path 602-7.

Figure 41A:
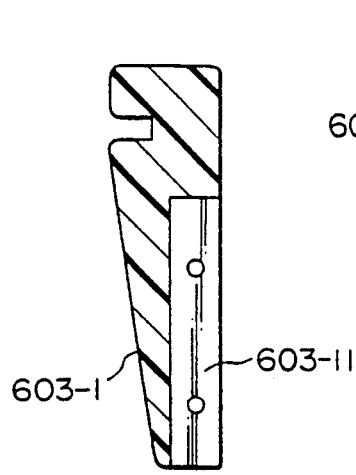
FIGS. 41A–41C are views showing a finger holder.
Figure 41B:
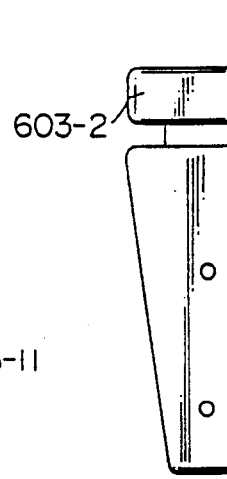
Figure 41C:
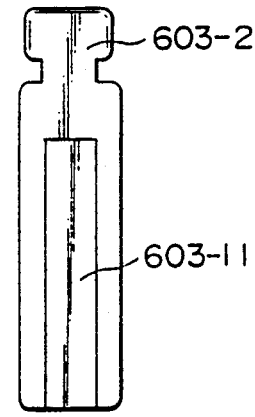
Figure 40D:
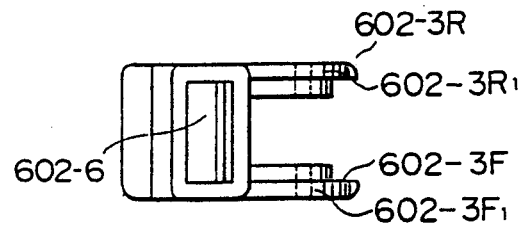

As shown in FIGS. 41A, 41B, and 41C, the finger holder 603 has one side surface inclined downward, and a groove 603-11 is formed in a lateral flat surface of this inclined portion 603-1. The upper portion of the groove 603-11 has a narrowed upper portion and has a rectangular engaging portion 603-2.

Figure 42A:
FIGS. 42A and 42B are views showing a sensor lot.
Figure 42B:
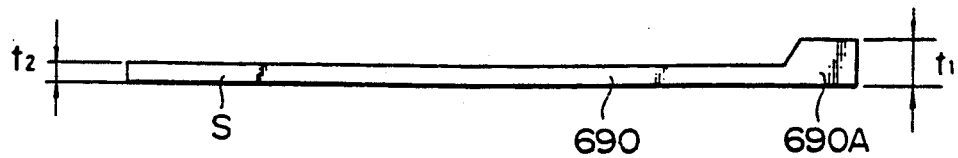

As shown in FIGS. 42A and 42B, the sensor lot 690-1 is obtained by cutting a sensor lot 690 in a manner to be described later. The sensor lot 690 has a flat, band-like shape. A base portion 690A of the sensor lot 690 is thicker than the remaining portion. A thickness $t_1$ of the base portion 690A is slightly smaller than a height $t_1$ (FIG. 39A) of the path 601-6 formed in the base block 601. A thickness $t_2$ of the remaining portion is slightly smaller than a height $h_2$ (FIG. 40A) of the path 602-7 formed in the end block 602. A width $W_1$ of the sensor lot 690 is slightly smaller than each of widths $W_2$ and $W_3$ ($W_2 = W_3$) of the paths 601-1 and 602-7.

An assembly operation of the base block 601, the end block 602, the finger holder 603, and the sensor lot 690-1 will be described with reference to FIG. 38A.

The base block 601 is fixed on an arm of a robot body (not shown), and air is supplied to the first and second paths 601-1 and 601-2.

First of all, the finger holder 603 is connected to the end block 602 such that the engaging portion 603-2 of the finger holder 603 is inserted into the lateral hole 602-4 of the end block 602 and is slid therein.

The collar surface portions 602-3F and 602-3R of the end block 602 mounted with the finger holder 603 are inserted into the recessed steps 601-3F and 601-3R of the base block 601, and a pin 604-1 is inserted in the mating through holes. In this case, pistons 606-1 and 606-1' mounted with O-rings 605 are inserted between the other-end openings 601-12 and 601-22 of the base block 601 and the boss holes 602-1 and 602-2 of the end block 602, respectively. The pistons 606-1 and 606-1' have axial holes 606-11 and 606-11', respectively. The length of the piston 606-1 is larger than that of the piston 606-1'.

The sensor lot 690 shown in FIG. 42 is inserted from its distal end portion S into the path 01-6 of the base block 601, and the distal end portion S passes through the path 602-7 of the end block 602. The sensor lot 690 is inserted until the base portion 690A oppose the through hole 601-7 of the base block 601. A pin 604-2 is inserted into the through hole 602-8 of the end block 602. The sensor lot 690 is held by the axial surface of the pin 604-2 and is fixed with respect to the end block 602. The distal end portion S of the sensor lot 690 which extends from the path 602-7 is cut to obtain the sensor lot 690-1.

An operation of the clap mechanism having the above structure will be described below.

Assume that compressed air is supplied to the path 601-2 of the base block 601 in FIG. 38, and that an operating state in FIG. 38 is set. That is, the predetermined gap h is formed between the opposite outer wall surfaces of the finger holder 603 and the base block 601. In this state, when supply of the compressed air to the path 601-2 is interrupted and compressed air is supplied to the path 601-1, this compressed air is supplied to a bottom wall surface of the boss hole 602-1 of the end block 602 through the path 606-11 of the piston 606-1. That is, the compressed air acts on a finger end block 602 assembled with the finger holder 603 (this assembly is referred to as a finger end block 607 hereinafter) by using the bottom wall surface of the boss hole 602-1 as a pressure-receiving surface. The finger end block 607 is pivoted about the pin 604-1 counterclockwise. The finger end block 607 is pivoted and the outer wall surface of the finger holder 603 is brought into contact with the outer wall surface of the base block 601 and the finger holder 603 is stopped by the base block 601. When a target object is located in the gap $h_1$ between the opposite outer wall surfaces of the finger holder 603 and the base block 601, or when a target object is located in the gap $h_2$ between the opposite grooves of the finger holder 603 and the base block 601, the target object can be clamped between the finger end block 607 and the base block 601.

On the other hand, when the finger end block 607 is pivoted about the pin 604-1 counterclockwise, the base portion 690A of the sensor lot 690-1 is slid inside the path 601-6 and is retracted with respect to the through hole 601-7. That is, when the finger end block 607 is pivoted counterclockwise, the through hole 601-7 closed by the base portion 690A of the sensor lot 690-1 is open. When this open state of the through hole 601-7 is optically detected using a pair of light-emitting and light-receiving elements, counterclockwise pivotal movement of the finger end block 607, i.e., clamping of the target object between the finger end block 607 and the base block 601 can be detected. This detection result is fed back to flexibly control the clamp mechanism.

When supply of the compressed air to the path 601-1 of the base block 601 is interrupted at an appropriate timing and compressed air is supplied to the path 601-2, this compressed air is supplied to the bottom wall surface of the boss hole 602-2 of the end block 602 through the path 606-11' of the piston 606-1'. That is, the compressed air acts on the finger end block 607 using the bottom wall surface of the boss hole 602-2 of the end block 2 as a pressure-receiving surface. The finger end block 607 is pivoted about the pin 604-1 clockwise. When the finger end block 607 is pivoted and the outer wall surface of the end block 602 is brought into contact with the outer wall surface of the base block 601 through the piston 606-1, rotation of the finger end block 607 is stopped, and the initial state is restored. If the target object is clamped between the finger end block 607 and the base block 601, the target object is released.

On the other hand, when the finger end block 607 is pivoted about the pin 604-1 clockwise, the base portion 690A of the sensor lot 690-1 is slid into the path 601-6 and is advanced with respect to the through hole 601-7. That is, when the finger end block 607 is pivoted clockwise, the through hole 601-7 which has been open due to the absence of the base portion 690A of the sensor lot 690-1 is closed again. This closed state of the through hole 601-7 is optically detected by a pair of light-receiving and light-emitting elements to detect clockwise rotation of the finger end block 607, i.e., to detect whether the finger end block 607 and the base block 601 release the target object. This detection result is fed back to flexibly control the clamp mechanism.

Figure 43:
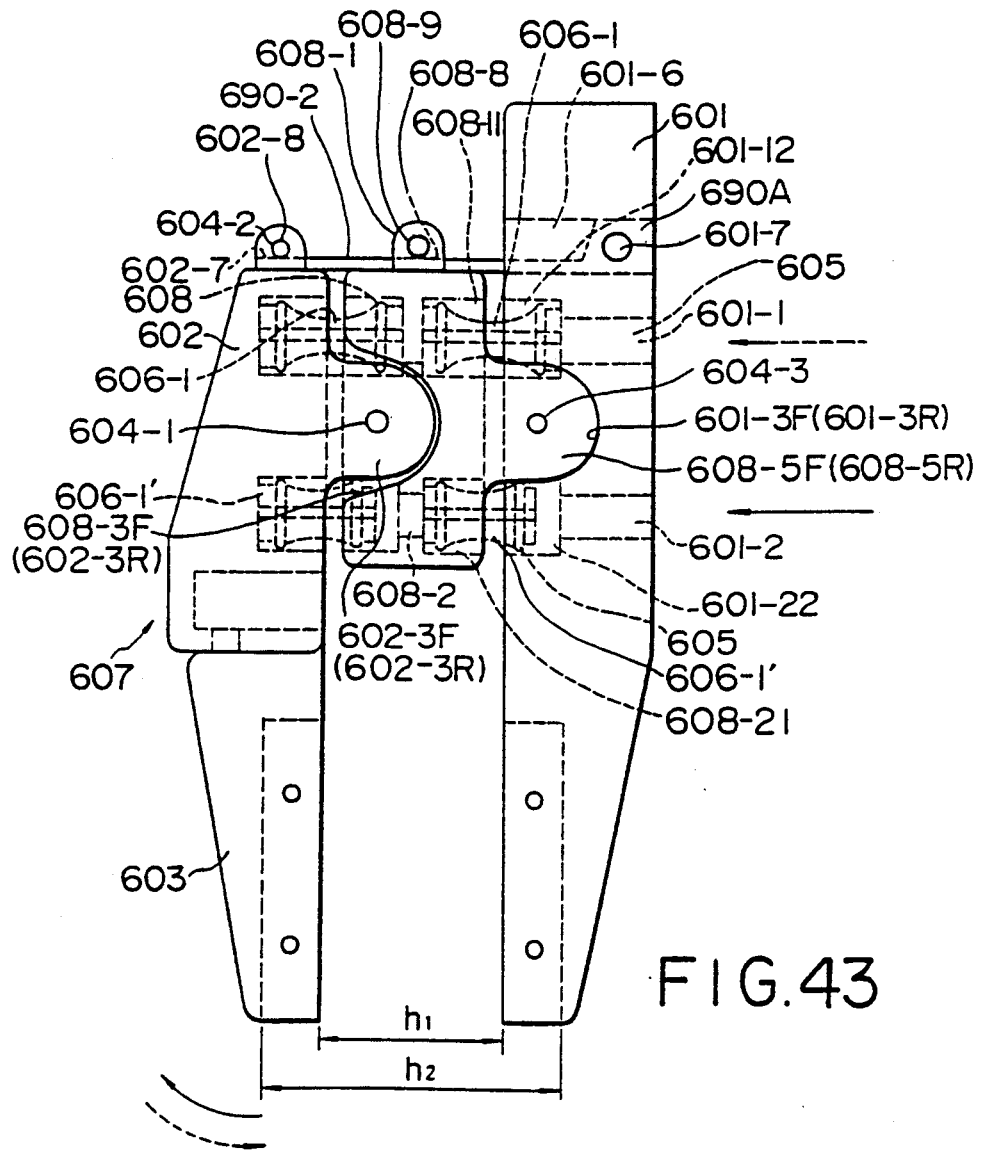
FIG. 43 is a front view showing another clamp mechanism including a joint mechanism.

FIG. 43 shows another clamp mechanism including a joint mechanism according to the present invention. The same reference numeral as in FIG. 38 denote the same parts in FIG. 43, and a detailed description thereof will be omitted. In this embodiment, a stand block 608 is assembled between a finger end block 607 and a base block 601.

As shown in FIGS. 44A, 44B, 44C, and 44D, the stand block 608 has a first path 608-1 and a second path 608-2. In the stand block 608, one-end openings 608-11 and 608-21 and the other-end openings 608-12 and 608-22 of the paths 608-1 and 608-2 have a large diameter. More specifically, in the first path 608-1, the one-end opening 608-11 and the other-end opening 608-12 communicate with each other through a small-diameter intermediate path 608-13. In the second path 608-2, the one-end opening 608-21 and the other-end opening 608-22 communicate with each other through a small-diameter intermediate path 608-23. Semicircular recessed steps 608-3F and 608-3R are respectively formed on the front and rear surfaces of the stand block 608, and a through hole 608-4 is formed in the recessed steps 608-3F an 608-3F. The stand block 608 also has semicircular collar surface portions 608-5F and 608-5R laterally extending on the front and rear surfaces, respectively. A through hole 608-6 is formed at the central portions, of the collar surface portions 608-5F and 608-5R. The stand block 608 also has a projection 608-7 on its upper surface portion. A laterally extending path 608-8 is formed in the projection 608-7. A through hole 608-9 is formed in the path 608-8 such that part of the through hole 808-9 crosses the path 608-8. A height $h_3$ of the path 608-8 is slightly larger than a thickness $t_1$ of the sensor lot 690 in FIG. 42. A width $W_4$ of the path 608-8 is slightly larger than a width $W_1$ of the sensor lot 690.

An assembly operation of the base block 601, the stand block 608, the finger end block 607, and a sensor lot 690-2 will be described with reference to FIG. 43.

The collar surface portions 608-5F and 608-5R of the stand block 608 are respectively inserted into the recess steps 601-3F and 601-3R of the base block 601, and a pin 604-3 is inserted into the mating through holes. The stand block 608 is pivotally supported on the base block 601. In this case, pistons 606-1 and 606-1' mounted with O-rings 605 ar inserted between the other-end openings 601-12 and 601-22 of the base block 601 and the one-end openings 608-11 and 608-21 of the stand block 608, respectively. When the pistons 606-1 and 606-1' are located as described above, the paths 608-1 and 608-2 of the stand block 608 communicate with the paths 601-1 and 601-2 of the base block 601.

Collar surface portions 602-3F and 602-3R of, the end block 602 mounted with a finger holder 603 are respectively inserted into the recessed steps 608-3F and 608-3F of the stand block 608, and a pin 604-1 is inserted into a mating through hole. In this case, the pistons 606-1 and 606-1' mounted with O-rings 605 are inserted between the other-end openings 608-12 and 608-22 and boss holes 602-1 and 602-2 of the end block 602.

The distal end portion S of the sensor lot 690 shown in FIG. 42 is inserted into a path 601-6 of the base block 601 and passes through the path 608-8 of the stand block 608. As shown in FIG. 42, the sensor lot 690 is inserted until the base portion 690A opposes the through hole 601-7 of the base block 690. A pin 604-2 is inserted into a through hole 602-8 of the end block 602. A distal end portion S of the sensor lot 690 extending from a path 602-7 is cut to obtain the sensor lot 690-2.

In the clamp mechanism having the above structure, as compared with the clamp mechanism shown in FIG. 38, the gaps $h_1$ and $h_2$ are increased by the size of the stand block 608. In the clamp mechanism, the sensor lot 690-2 can be smoothly reciprocated by using the path 608-8 of the stand block 608 as a guide.

In the above embodiment, the one-end portion of the sensor lot 690-2 is fixed to the end block 602. However, as in the end block 602 in FIG. 38, the pin is inserted into the through hole 608-9 and the distal end portion S extending from the path 608-8 is cut and may be fixed to the stand block 608. When the number of stand blocks 608 is increased, i.e., the stand blocks 608 are aligned in the lateral direction, and when the end block 608 is pivotally supported on the last stand block 608, the gaps $h_1$ and $h_2$ can be further increased and can be flexibly controlled. In this case, the one-end portion of the sensor lot can be fixed on the end block 602 or on any stand block. When the one-end portion of the sensor lot is fixed to any stand block, gaps smaller or larger than the gaps $h_1$ and $h_2$ can be detected on the basis of the reciprocal movement of the sensor lot.

In each of the above embodiment, the base portion 690A of the sensor lot is constituted by a free end portion, and reciprocal movement of the free end portion is optically detected. However, the reciprocal movement may be mechanically detected by using a limit switch or the like.

When a compression coil spring is used in place of the piston 606-1 in each of the above embodiments, supply of the compressed air to a path 601-2 of the base block 601 is not interrupted, the supply of the compressed air to the path 601-1 is interrupted, and the finger end block 607 can be automatically returned to the home position.

In each of the above embodiments, the end block 607 is combined with the end block 602 and the finger holder 603. However, the end block 602 may be formed integrally with the finger holder 603.

The clamp mechanism shown in FIG. 42 is used in place of the distal joint unit end of the joint finger shown in FIGS. 1 to 37, a multi-articulated finger can be arcuatedly pivoted, and the clamp mechanism can be operated with an arcuated movement. In addition, since the multi-articulated finger can be pivoted in an S shape, the clamp mechanism can be operated while being moved linearly.

In addition, pivotal movement of the joint unit end (corresponding to the end block) and the joint unit (corresponding to the stand block) can be detected. A detection result is fed back to flexibly control the multi-articulated finger.

What is claimed is:

1. A robot finger structure comprising:
   a first joint member having a pair of separate fluid paths;
   a second joint member pivotally supported by said first joint member said second joint member having a pair of separate fluid paths each in fluid communication with a different one of said pair of fluid paths of said first joint member, at least some of said fluid paths of said first and second joint member having oppositely facing outwardly opening large diameter path portions intercoupled by a small diameter path portion;
   a plurality of pistons each located in different ones of facing large diameter path portions of said first and second joint members, said pistons having a throughbore for transmitting fluid pressure therethrough;
   fluid supply means for selectively supplying a fluid to the separate fluid paths of said first joint member; and
   a third joint member pivotally supported by said second joint member, said third joint member having first and second portions in fluid communication with the facing ones of the large diameter path portions of said second joint member so that said third joint member is pivoted upon reception of a pressure of the fluid selectively supplied to said first and second joint members through the fluid paths and said pistons, and is brought into contact with said second joint member, said second joint member being pivoted in response to contact by said third joint member and also in receipt of fluid pressure along one of said pair of separate fluid paths,
   said structure further including means associated with one of said pair of fluid paths for returning to a home position a joint member pivoted as a result of selective fluid supply to one of the fluid paths of said first joint member.

2. A structure according to claim 1, wherein said first and second joint members and said second and third joint members are pivotally supported so as to perform a two-dimensional operation.

3. A structure according to claim 1, wherein at least said second joint member has, in the fluid path thereof, a pressure-receiving surface for pivoting said second joint member.

4. A structure according to claim 1, wherein at least said second joint member is formed so that an outer wall surface thereof brought into contact with an outer wall surface of another joint member is inclined to oppose the outer wall surface of said another joint member.

5. A structure according to claim 1 wherein said returning means includes a sub-plurality of those pistons located in said large diameter path portions, said sub-plurality comprising those pistons arranged along one of said pair of separate fluid paths.

6. A structure according to claim 1 further including a plurality of serially arranged second joint members, a first one of said second joint members being pivotally supported by said first joint member and in fluid communication therewith, at least one of said second joint members providing pivotal support for said third joint member and being in fluid communication therewith, an intermediate ones of said second joint members being pivotally coupled and in mutual fluid communication along the separate fluid paths therethrough.

* * * * *